US007820255B2

(12) United States Patent
Okubo et al.

(10) Patent No.: US 7,820,255 B2
(45) Date of Patent: Oct. 26, 2010

(54) TRANSPARENT FILM FOR DISPLAY SUBSTRATE, DISPLAY SUBSTRATE USING THE FILM AND METHOD OF MANUFACTURING THE SAME, LIQUID CRYSTAL DISPLAY, ORGANIC ELECTROLUMINESCENCE DISPLAY, AND TOUCH PANEL

(75) Inventors: Yasushi Okubo, Hino (JP); Kazuto Kiyohara, Kokubunji (JP); Satomi Kawabe, Hachioji (JP)

(73) Assignee: Konica Minolta Holdings, Inc., Tokyo (JP)

(*) Notice: Subject to any disclaimer, the term of this patent is extended or adjusted under 35 U.S.C. 154(b) by 483 days.

(21) Appl. No.: 10/558,363

(22) PCT Filed: May 12, 2004

(86) PCT No.: PCT/JP2004/006690

§ 371 (c)(1),
(2), (4) Date: Nov. 25, 2005

(87) PCT Pub. No.: WO2004/107297

PCT Pub. Date: Dec. 9, 2004

(65) Prior Publication Data

US 2007/0009674 A1 Jan. 11, 2007

(30) Foreign Application Priority Data

May 29, 2003 (JP) .............................. 2003-152403

(51) Int. Cl.
B32B 7/02 (2006.01)

(52) U.S. Cl. ...................................................... 428/1.6

(58) Field of Classification Search ................... 428/1.3, 428/1.32, 1.6; 536/32, 43, 58, 66; 427/569, 427/579, 488–489, 66
See application file for complete search history.

(56) References Cited

U.S. PATENT DOCUMENTS

| 4,423,112 | A | * | 12/1983 | Luthringshauser et al. ... 428/389 |
| 4,973,511 | A | * | 11/1990 | Farmer et al. ............... 428/216 |
| 5,442,517 | A | * | 8/1995 | Yen et al. .................... 361/305 |
| 5,820,994 | A | * | 10/1998 | Gotoh et al. ................ 428/451 |
| 5,840,465 | A | * | 11/1998 | Kakinuma et al. ........ 430/270.1 |
| 6,835,425 | B2 | * | 12/2004 | Fukuda et al. .............. 427/569 |
| 6,866,949 | B2 | * | 3/2005 | Ota et al. .................... 428/702 |
| 7,141,304 | B2 | * | 11/2006 | Yamada et al. ............. 428/447 |
| 7,220,460 | B2 | * | 5/2007 | Murakami et al. ......... 427/491 |
| 2002/0086163 | A1 | * | 7/2002 | Shimizu et al. ........... 428/424.4 |
| 2002/0102369 | A1 | * | 8/2002 | Shimizu et al. ............ 428/1.33 |
| 2002/0123209 | A1 | * | 9/2002 | Yamada et al. ............. 438/432 |
| 2002/0180924 | A1 | * | 12/2002 | Sobrinho .................... 349/158 |
| 2002/0187371 | A1 | * | 12/2002 | Nakajima ................... 428/701 |
| 2003/0020208 | A1 | * | 1/2003 | Tasaka et al. ............... 264/217 |
| 2003/0151707 | A1 | * | 8/2003 | Kobayashi et al. ........... 349/96 |
| 2003/0170482 | A1 | * | 9/2003 | Murakami .................. 428/615 |

OTHER PUBLICATIONS

JPO Website Machine English Translation of Abstract of JP 04-209606, Igarishi Takaharu, Jul. 31, 1992.*

* cited by examiner

*Primary Examiner*—Sophie Hon
(74) *Attorney, Agent, or Firm*—Lucas & Mercanti, LLP

(57) ABSTRACT

A transparent film for display substrate containing a cellulose ester, a plasticizer content in an amount of less than 1 percent, the aforementioned film being drawn 3 through 100 percent both in the direction of conveyance and across the width.

19 Claims, 3 Drawing Sheets

TRANSPARENT FILM FOR DISPLAY SUBSTRATE, DISPLAY SUBSTRATE USING THE FILM AND METHOD OF MANUFACTURING THE SAME, LIQUID CRYSTAL DISPLAY, ORGANIC ELECTROLUMINESCENCE DISPLAY, AND TOUCH PANEL

FIELD OF THE INVENTION

The present invention relates to a transparent film for display substrate characterized by a low coefficient of linear expansion and preferable application to a display substrate, and the manufacturing method thereof, particularly to a liquid crystal display, organic electroluminescence display and touch panel wherein this transparent film for display substrate is used as a substrate.

TECHNICAL BACKGROUND

Since glass has an excellent thermal stability and transparency as well as low vapor permeability, the glass have been used in the prior art as a substrate for the electronic display device such as a liquid crystal display device, organic electroluminescence (EL) display device, plasma display device and electronic paper, as a substrate for an electron-optical device such as a CCD or CMOS sensor, or a substrate for a solar battery. However, with the recent spread of a cellular phone and portable information terminal, there is an active demand for a substrate characterized by flexibility, light weight and resistance to cracks, to take place of the glass as a substrate which is comparatively heavy and susceptible to cracks.

In the liquid crystal display, birefringence is used for on-off operation of the display, and therefore, reduced birefringence is essential. Further, when various forms of functional thin film are formed on a plastic substrate, it is exposed to high temperature. This requires a high degree of resistance to heat. Especially when the transparent conductive film that is an essential functional thin film as a display substrate is to be formed into a low-resistant crystalline thin film, it is required to have a resistance to a high temperature of 180 degrees Celsius. Since all of these three physical properties are indispensable, it can be easily seen that many of the plastic substrates are not suited for display.

The material for the plastic substrate meeting such requirements is exemplified by polyether sulfone and polycarbonate. Especially, the Official Gazette of Japanese Patent Tokkaihei 5-142525 discloses a transparent film formed by lamination of a polyether sulfone and acryl based substrates, and recommends it to be used as a plastic substrate. As a result, this transparent film has come to be used in some cases. However, when the plastic substrate is used to manufacture a liquid crystal display and an organic electroluminescence display, it has been found out that such a product is accompanied by various faults that have not been observed in the glass substrate.

In the first place, unlike the glass substrate, the plastic substrate has the disadvantage of more or less allowing the passage of a gas such as vapor and oxygen that have an adverse effect on the devices constituting the display.

To overcome such disadvantages, an inorganic thin film having excellent gas barrier characteristics is used to cover the plastic substrate according to the vacuum deposition and sputtering method. It has been clarified that moisture permeability of the plastic substrate can be reduced by silicon oxide, for example.

However, the plastic substrate has a coefficient of thermal expansion a single to double digit greater than the glass substrate. This has resulted in a crack of a functional thin film arranged on the plastic substrate, or displacement of the pixel. It has been made clear that such a problem arises. In the aforementioned gas barrier type inorganic thin film, moisture permeability is drastically increased if a crack occurs. In the transparent conductive film, conductivity is reduced.

It is commonly known that the expansion coefficient of plastic film relative to heat and humidity can be reduced by drawing. Since drawing also increases the birefringence, a plastic substrate suited for use in the display cannot have been obtained even by drawing the aforementioned PES.

Thus, there has been no success in finding out a transparent plastic substrate having a low coefficient of thermal expansion in addition to three physical properties including low birefringence, high heat resistance and high transparency.

Further, a method of providing a gas barrier layer to control the passage of moisture or oxygen normally includes vacuum deposition, sputtering and vacuum plasma CVD methods. These methods involve use of complicated and bulky equipment, and have been characterized by low productivity and high cost in the arrangement of an inorganic thin film.

The first object of the present invention is to provide a transparent plastic film for use in a liquid crystal display, organic electroluminescence display or touch panel, the transparent plastic film being characterized by a high degree of transparency and heat resistance, as well as reduced birefringence and coefficient of thermal expansion.

The second object of the present invention is to provide measures for providing a gas barrier film of low moisture permeability and high durability by means of a simple process.

The third object of the present invention is to provide a liquid crystal display and a touch panel ensuring the minimum image distortion or color misregistration, and an organic electroluminescence display characterized by a high luminance of light emission.

DISCLOSURE OF THE INVENTION

To solve the aforementioned problems, the present inventors paid attention to a cellulose ester film. The cellulose ester film is a plastic of low birefringence and high transparency, and is commonly used as a film for protecting a polarizer in a liquid crystal display utilizing such properties.

However, cellulose ester is a moisture absorbing resin and has a disadvantage of having a high moisture absorbing expansion coefficient. To make up for this defect of the cellulose ester, as much as 5 through 20 percent by mass of such a plasticizer as a phosphoric acid ester is used in the prior art. However, it has been found out that the plasticizer reduces the glass-transition temperature of the cellulose ester and increases the thermal expansion coefficient.

In an effort to solve the aforementioned problems, the inventors of the present invention have found out that a high glass-transition temperature can be achieved by keeping the percentage of plasticizer content down below a predetermined level, and at the same time, the thermal expansion coefficient can be reduced by biaxially drawing of the cellulose ester film. Further, surprisingly, it has been found out that cellulose ester is excellent controllability of birefringence; the birefringence can be kept small even if the cellulose ester is drawn. The disadvantage of reduced amount of the plasticizer to be added can be reduced by formation of a gas barrier. These findings have led to the present invention.

The aforementioned objects of the present invention can be achieved by the following:

1. A transparent film for display substrate containing a cellulose ester and a plasticizer in an amount of less than 1 percent, the film drawn 3 through 100 percent both in a conveyance direction and a width direction.
2. The transparent film for display substrate of the aforementioned 1 containing a hydrolyzed polycondensate of the cellulose ester and an alkoxysilane expressed by the following general formula (1):

$$R_{4-n}Si(OR')_n \qquad \text{General formula (1)}$$

(where R and R' represent a hydrogen atom or monovalent substituent, and "n" denotes 3 or 4).
3. The transparent film for display substrate of the aforementioned 2, wherein the hydrolyzed polycondensate of the cellulose ester and the alkoxysilane expressed by the following general formula (1) are expressed by the following general formula (2), and a total amount of inorganic high molecular compounds expressed by the following general formula (2) is less than 40 percent by mass in the transparent film: R

$$R_{4-n}SiO_{n/2} \qquad \text{General formula (2)}$$

(where R is synonymous with that in said general formula (1)).
4. The transparent film for display substrate in any one of the aforementioned 1 through 3 containing an organic crosslinking agent having a plurality of any of the isocyanate group, thioisocyanate group and acid hydride residue, in an amount of 1 through 20 percent by mass, so that crosslinked with cellulose ester is formed.
5. The transparent film for display substrate in any one of the aforementioned 1 through 4, wherein the number average molecular mass of the cellulose ester is 100,000 or more.
6. The transparent film for display substrate in any one of the aforementioned 1 through 4, wherein the substituent of the cellulose ester satisfies the following formula (A) and (B):

$$0 \leq Y \leq 1.5 \qquad \text{Formula (A)}$$

$$1.0 \leq X+Y \leq 2.9 \qquad \text{Formula (B)}$$

(wherein "X" denotes the degree of substitution and "Y" indicates the degree of substitution by using a substituent containing an alkoxysilyl group).
7. The transparent film for display substrate in any one of the aforementioned 1 through 6, wherein the degree of substitution of said cellulose ester by the acetyl group is 2.2 through less than 2.9.
8. The transparent film for display substrate in any one of the aforementioned 1 through 7, wherein the transparent film contains a crosslinked polymer and the cellulose ester and the crosslinked polymer forms a semi-IPN (semi-interpenetrating polymer network) type polymer alloy.
9. The transparent film for display substrate of the aforementioned 8, wherein the transparent film contains the crosslinked polymer in an amount of 5 through 50 percent by mass of the transparent film.
10. The transparent film for display substrate in any one of the aforementioned 1 through 9, wherein the transparent film is composed of a cellulose film of which glass-transition temperature obtained by thermal mechanical analysis (TMA) is 180 degrees Celsius or more, and the coefficients of linear expansion in both MD and TD directions are in the range from 5 through 50 ppm/degrees Celsius.
11. The transparent film for display substrate in any one of the aforementioned 1 through 10 wherein, when the in-plane retardation value at the wavelength of 590 nm is $R_0$ (590) and the in-plane retardation value at the wavelength of 480 nm is $R_0$ (480), the ratio $[R_0(480)/R_0(590)]$ is not less than 0.8 through less than 1.0.
12. A display substrate wherein a moisture proof film containing a metal oxide or metal nitride is formed on at least one of the surfaces of a transparent film for display substrate in any one of the aforementioned 1 through 11, and a transparent conductive film is formed on the moisture proof film or on the surface opposite to the surface where the moisture proof film is formed.
13. The display substrate of the aforementioned 12, wherein said moisture proof film is mainly composed of silicon oxide.
14. The display substrate of the aforementioned 12 or 13, wherein the moisture proof film and the transparent conductive film is formed by applying a high frequency voltage between opposed electrodes under atmospheric pressure or under approximately atmospheric pressure for a discharge, generating a reactive gas in the plasma state by the discharge, exposing the transparent film for display substrate to the reactive gas in the plasma state whereby the moisture proof film and the transparent conductive film are formed on the transparent film.
15. A liquid crystal display using the display substrate in any one of the aforementioned 12 through 14.
16. An organic electroluminescence display using the display substrate in any one of the aforementioned 12 through 14.
17. A touch panel using the display substrate in any one of the aforementioned 12 through 14.
18. A method for manufacturing a transparent film for display substrate according to a casting film forming method, comprising the steps of:

casting the dope containing a cellulose ester and a plasticizer in an amount of less than 1 percent, onto a casting support member to form a web;

drawing the web 3 through 100 percent both in the conveyance direction and the width direction; and drying the web.
19. A method for manufacturing a display substrate comprising the steps of:

applying a high frequency voltage between opposed electrodes under atmospheric pressure or under approximately atmospheric pressure for a discharge, generating a reactive gas in the plasma state by the discharge, exposing the transparent film for display substrate formed by the method of the aforementioned 18 to the reactive gas in the plasma state whereby the moisture proof film and the transparent conductive film are formed on the transparent film.
20. The method for manufacturing a display substrate of the aforementioned 19, wherein the frequency of the high frequency voltage is in the range from 100 kHz through 2.5 GHz, and the supply power is in the range from 1 W/cm$^2$ through 50 W/cm$^2$.
21. The method for manufacturing a display substrate of the aforementioned 20, wherein the frequency of said high frequency voltage is in the range from 100 kHz through 150 MHz.

BEST MODE FOR CARRYING OUT THE INVENTION

Figure 1:
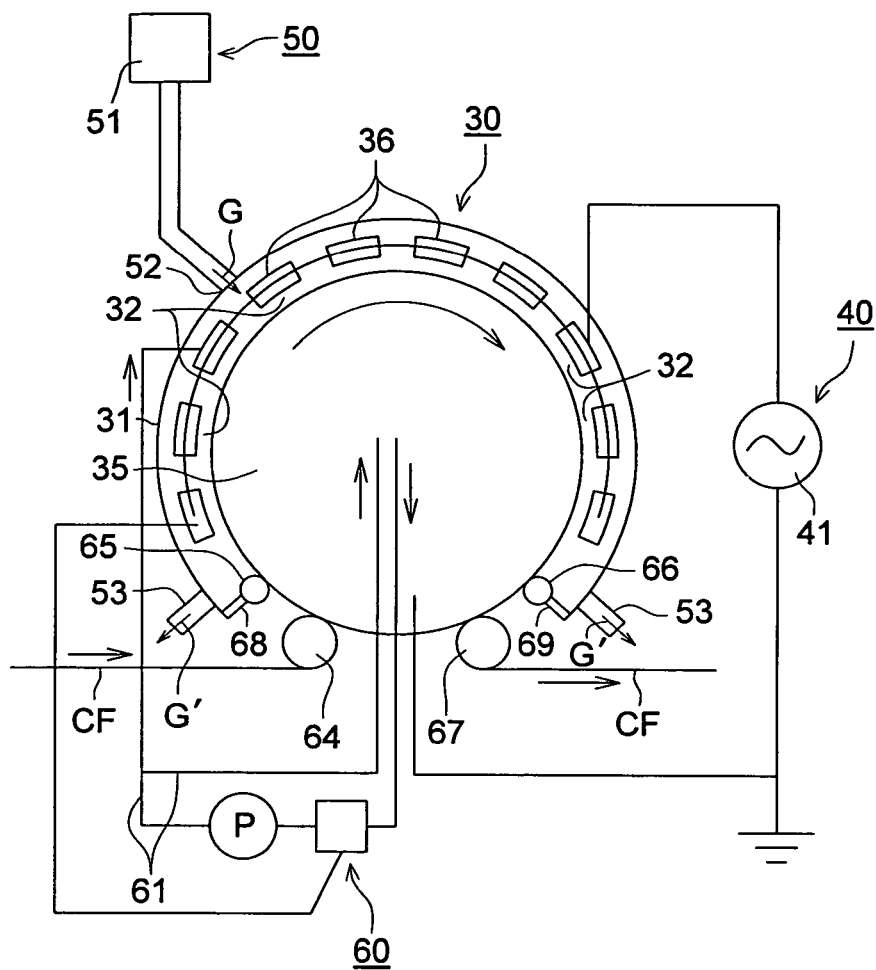
FIG. 1 is a drawing representing an example of the plasma discharge apparatus under the atmospheric pressure of the present invention or the pressure close to it.

The following describes the details of the present invention:

The transparent film for display substrate in the present invention refers to the transparent plastic film used as a support member or a substrate for such an electronic device as a liquid crystal display, organic electroluminescence display and touch panel.

These transparent films for display substrate are required to provide a firm support of various types of functional thin films constituting such an electronic device as a liquid crystal display, organic electroluminescence display and touch panel. Further, these films are also required to have superb flexibility and light weight.

In the meantime, the display substrate is required to ensure that the display device having been formed is isolated from the outside air including moisture and oxygen. When used as a substrate, low moisture and oxygen permeability must be ensured. Normally, when a plastic film is used as a substrate, the film must be coated with a moisture proof thin film such as a silicon oxide film.

A conductive thin film is also essential as the common functional thin film constituting the aforementioned display device. For example, an ITO film is used as a transparent conductive film.

These thin films are basically made of metallic oxide. There is no problem if they are formed on a substrate such as glass characterized by smaller expansion and contraction due to heat or moisture. However, the substrate made of plastic is subjected to conspicuous expansion and contraction due to heat and moisture. Thus, expansion and contraction of the substrate are caused by thermal hysteresis in the production process (rise of temperature due to processing of the substrate of various types of materials by vapor deposition and sputtering). Thus, optical displacement, for example, is caused between layers. Especially the metallic oxide film formed on the substrate is vulnerable to cracks due to expansion and contraction resulting from exposure to heat and moisture, because of brittleness. This film is prone to characteristic variation.

Thus, the plastic film used as a support member or substrate of the aforementioned electronic device is less vulnerable to the expansion and contraction due to drastic changes in temperature and humidity in the process of manufacturing the functional thin film constituting the electronic device. The thin film having been formed is less subjected to fracture (such as cracks and separation). Further, the functional thin film having been formed, such as a moisture proof film or a transparent conductive film is required to be resistant to cracks, even when exposed to bending force.

It is also required that the expansion and contraction of the substrate caused by changes in temperature and humidity in the environment where a display apparatus is used (e.g. heat by the backlight of the liquid crystal display apparatus) do not cause a change in the characteristics of the moisture proof film and conductive film formed on the substrate.

The glass having been used as a substrate material has a low expansion coefficient. When it is used as a substrate or as a protective sheet to seal devices, it has been used preferably.

The present inventors have found out a film preferably used to take the place of glass as a substrate material. This film is further characterized in that glass-transition temperature obtained by thermal mechanical analysis (TMA) is 180 degrees Celsius (° C.) or more, and the coefficients of linear expansion in both the MD and TD directions are in the range from 5 through 50 ppm/degrees Celsius.

The transparent film of the present invention for display substrate has a characteristic like this and is characterized in that the film having such performances contains a cellulose ester with plasticizer content accounting for less than 1 percent, and is drawn 3 through 100 percent both in the conveyance direction and the width direction.

The transparent film for display substrate is preferred to be a cellulose ester film formed by the casting method. In the manufacturing process of cellulose ester film, the cellulose ester film is drawn across the width. In this case, the direction of mechanical conveyance will hereinafter be called the MD direction, and the direction perpendicular thereto will be called the TD direction.

When the linear expansion coefficient of the transparent film for display substrate is in the aforementioned range, the functional thin film formed on the film such as the aforementioned moisture proof film or transparent conductive film does not lose the aforementioned characteristics even when exposed to thermal hysteresis at the time of manufacture or the stress caused by heat or bending of the substrate subsequent to formation of the device on the substrate.

The linear expansion coefficient of the transparent film for display substrate in the present invention can be obtained from the temperature-strain curve in the thermal mechanical analysis (TMA).

The TMA-SS6100 by Seiko Instrument Co., Ltd. is used as an actual measuring instrument. A sample having a film thickness of 100 μum and a width of 4 mm is fixed at a chuck distance of 20 mm, and the temperature is increased from the room temperature to 180 degrees Celsius. After the residual strain has been removed, the temperature is again increased from the room temperature to 180 degrees Celsius at a rate of 5 degrees Celsius/min., whereby the linear expansion coefficient is obtained from the expansion of the chuck distance. For example, when the temperature of the film material has rose 1 degree Celsius, and the size gas expanded 0.001 mm (1 μm) per meter, the thermal expansion coefficient of the support member is said to be 1 ppm.

The transparent film for display substrate of the present invention is a film containing the cellulose ester, and can be used in the aforementioned various types of electronic devices when such a functional thin film as a moisture proof film or transparent conductive film is formed on the film.

A triacetyl cellulose, or a fatty acid cellulose ester mixed with acetyl group, propionyl group or butyryl group can be used as the cellulose ester. The cellulose ester is preferably used when the total degree of substitution of all the acyl groups (total of the degree of substitution) is greater than 1.5.

The glucose unit forming the cellulose has three hydroxyl groups that can be combined. For example, the degree of substitution by the acetyl group in the cellulose triacetate is 3.0 when all three hydroxyl groups of the glucose unit are bonded with the acetyl group.

In practice, replacement of all the hydroxyl groups is difficult due to the problems with synthesis by high molecular reaction. The cellulose ester having been subjected to complete acyl substitution does not easily dissolve in the solvent. It has a high viscosity of solution and the productivity is low.

In practice, what is commonly called triacetyl cellulose (TAC) has a degree of substitution of acetyl ranging from 2.8 through 2.9. The triacetyl cellulose (TAC) used in the cellulose ester of the present invention also has a degree of substitution of acetyl within this range.

What is commonly called the diacetyl cellulose (DAC) also has a degree of substitution of acetyl ranging from about 2.2 through 2.5. The diacetyl cellulose (DAC) is used in the cellulose ester of the present invention also has a degree of substitution of acetyl within this range. Accordingly, in the cellulose ester of the present invention, the preferred degree of substitution of acetyl is 2.2 through 2.9.

The degree of substitution of acetyl group can be measured according to the ASTM-D817-96.

The aforementioned acyl group can be substituted into the second, third and six positions of the glucose unit. Alternatively, it can be substituted into the sixth position at a higher rate, for example. Such a substitution accompanied by a certain distribution is also acceptable.

The cellulose ester resin used in the present invention can be the cellulose ester meeting the following formulae (A) and (B), for the purpose of further upgrading the means for improvement including the organic/inorganic hybrid or crosslinking to be described later:

$$0 \leq Y \leq 1.5 \quad \text{Formula (A)}$$

$$1.0 \leq X+Y \leq 2.9 \quad \text{Formula (B)}$$

In the aforementioned formulae, "X" denotes the degree of substitution by the acetyl group of the hydroxyl group of cellulose as a skeleton, and "Y" indicates the degree of substitution by the substituent containing alkoxysilyl group.

There are three hydroxyl groups in the glucose in the cellulose. When all of them have been replaced, $X+Y=3.0$.

The ester group constituting these cellulose esters is acetyl group so that a cellulose ester characterized by high heat resistance and low linear expansion coefficient is provided. For the purpose of further upgrading the modification effect by the organic/inorganic hybrid to be described later, replacement can be achieved using the substituent wherein the residual hydroxyl group contains an alkoxysilyl group. An example includes the one wherein some of the hydroxyl group of the cellulose replaced by the silane coupling agent reacting therewith. The silane coupling agent preferably used is exemplified by glycide and isocyanate-based agents, such as γ-glycidoxypropyltrimethoxysilane, γ-glycidoxypropylmethyldimethoxysilane, 3-triethoxysilylpropylsuccinate anhydride, and γ-isocyanatepropyltrimethoxysilane. Especially, isocyanate based agents are preferred. The especially preferred silane coupling agent is exemplified by γ-isocyanatepropyltrimethoxysilane. The alkoxysilyl group replaced by the cellulose ester by reaction with them is subjected to polycondensation with alkoxysilane expressed by the aforementioned general formula (1), whereby a cellulose-silica hybrid polymer film is formed by the organic/inorganic hybrid in an integrated form. However, if the degree of substitution Y by alkoxysilyl group is too large, the network structure of the transparent film will be too close and the film will be brittle. To prevent this, Y is preferably 1.5 or less.

In the cellulose ester, X+Y is preferably not less than 1.0 through not more than 2.9, because this ensures higher resin solubility and allows a dope of high concentration to be produced. This is more advantageous at the time of production and drying.

The cellulose ester has a preferable wavelength dispersion characteristic of birefringence and contains hydroxyl groups. These hydroxyl groups can be replaced by the substituent having an alkoxysilyl group, as described above. When such a cellulose ester is used as a skeleton, it is possible to produce a highly heat resistant transparent film characterized by low cost and birefringence, and positive wavelength dispersion of birefringence.

The positive wavelength dispersion of birefringence can be explained as follows: For example, a high polymer is dissolved in a solvent that permits dissolution, and is cast and dried on a glass plate so that the film thickness will be 100 μm in the drying step. Then a film is produced. The in-plane retardation value $R_0$ (480) of the film made of this high polymer at a wavelength of 480 nm and the in-plane retardation value $R_0$ (590) of the film made of this high polymer at a wavelength of 590 nm are measured. In this case, the ratio $[R_0(489)/R_0(590)]$ is smaller than 1.

In the transparent support member used in the laminated film in the present invention, the value obtained by dividing the in-plane retardation value $R_0$ (480) at a wavelength of 480 nm by the in-plane retardation value $R_0$ (590) at a wavelength of 590 nm, $R_0(480)/R_0(590)$ is preferably 0.8 or more through not more than 1.0.

In a transparent film characterized by positive wavelength dispersion of birefringence, compensation for polarization in the full-wavelength of the visible light is possible. In a liquid crystal panel using the display method based on birefringence, color misregistration is not observed, and excellent contrast is ensured in an organic electroluminescence display device.

No restriction is imposed on the cellulose ester as the material of the cellulose used in the present invention. It is exemplified by cotton linter, wood pulp and kenaf. The cellulose obtained therefrom can be used independently or can be mixed at desired proportions for use. Use of not less than 50 percent by mass cotton linter is preferred.

The molecular weight of the cellulose ester usable in the present invention is preferably 70,000 through 200,000 in terms of number average molecular weight (Mn), and more preferably 100,000 through 200,000, from the viewpoint of the modulus of elasticity of the film to be produced, dope viscosity and film formation speed. The cellulose derivative used in the present invention has an Mw/Mn ratio of less than 3.0, and preferably 1.4 through 2.3.

The average molecular weight and molecular weight distribution of the cellulose ester can be measured using a high-speed liquid chromatography. The number average molecular weight (Mn) and weight average molecular weight (Mw) can be calculated using these measurements, and the ratio thereof can be calculated.

The following describes the measurement conditions:

Solvent: Methylene chloride

Column: Shodex K806, K805, K803G (three columns by Showa Denko K.K. were connected for use)

Column temperature: 25 degrees Celsius

Sample concentration: 0.1 percent by mass

Detector: RI Model 504 (by GL Science Inc.)

Pump: L6000 (by Hitachi Limited)

Flowrate: 1.0 mL/min.

Calibration curve: Standard polystyrene STK (by Toso Co., Ltd.)

A calibration curve was used, where thirteen samples of MW ranging from 1,000,000 through 500 were employed. Thirteen samples are preferably arranged at an equally spaced interval.

The cellulose ester used in the present invention can be synthesized using acid anhydride and acid chloride as an acylating agent. When acid chloride is used as the acylating agent, organic acid (e.g. acetic acid) and methylene chloride are used as a reaction solvent. An acid catalyst such as sulfuric acid is used as a catalyst. When acid chloride is used as an acylating agent, a basic compound is used as a catalyst. According to the commonest method of synthesis in the industry, cellulose is esterified by the mixed organic acid components containing the organic acid corresponding to the acetyl group (e.g. acetic acid and propionic acid anhydride) or the acid anhydride (e.g. acetic acid anhydride and propionic acid anhydride), whereby cellulose ester is synthesized. When other acylating agent is used in combination, adjustment is made, for example, to ensure that the amount of propionylating agent used will be within the range of the degree of substitution required by the ester to be synthesized. The amount of the reaction solvent to be used is preferably 100 through 1,000 parts by mass, more preferably 200 through 600 parts by mass with respect to 100 parts by mass of cellulose. The amount of the acid catalyst to be used is 0.1 through 20 parts by mass, more preferably 0.4 through 10 parts by mass, with respect to 100 parts by mass of cellulose.

The reaction temperature is preferably 10 through 120 degrees Celsius, more preferably. 20 through 80 degrees Celsius. Upon completion of acyl substitution, hydrolysis (saponification) can be carried out was required, so as to adjust the degree of substitution. Upon completion of reaction, the reaction mixture is separated by the commonly practiced method, such as by sedimentation. Then cleaning and drying are performed to get a cellulose ester.

Dope is the solvent obtained by dissolving the cellulose ester, for example, in the organic solvent such as methylene chloride, methyl acetate, methanol and ethanol at a concentration of 10 through 35 percent by mass (more preferably 15 through 25 percent by mass). An additive is added to the dope solution obtained by dissolving the cellulose ester, if required. This solution is cast onto the support member (produced by mirror-finishing of a belt- or drum-like stainless steel) (in a step of casting), and is heated. After part of the solvent has been removed (in the step of drying on the support member), the film is separated from the support member, and the separated from is dried (in a step of film drying), whereby a cellulose ester is obtained. After drying, the film is drawn in the MD and TD directions if required, as will be described later in details. It is concurrently or sequentially drawn in the MD and TD directions until it is drawn 3 through 100 percent. This procedure causes molecular orientation so that the linear expansion coefficient of the film is reduced.

The transparent substrate film of the present invention for a display contains cellulose ester 50 to 100% by weight, more preferably 75 to 956 by weight. In addition to the cellulose ester, the transparent substrate film of the present invention for a display contains constituents, such as below-mentioned inorganic polymer, a crosslinking agent and crosslinked polymer 0 to 50% by weight, more preferably 5 to 25% by weight.

To reduce the moisture permeability and to improve the film formation performance, 1 through 20 percent by mass of plasticizer is added to the normal cellulose ester film for photographs or the cellulose ester film for polarizer protection. The amount of the plasticizer contained in the transparent substrate film for display in the present invention is preferably less than 1 percent, for the purpose of reducing the linear expansion coefficient.

In the present invention, the plasticizer is defined as a low molecular compound having a molecular weight of less than 1,000, the compound being chemically inactive (without chemical reaction of bonding with a cellulose ester or polymerization).

In the prior art, 5 through 20 percent by mass was included in the cellulose ester as a support member of the negative film of the photograph, or in the cellulose ester film for polarizer protection of the liquid crystal display.

This was intended to make up for the disadvantage of the cellulose ester. Since the cellulose ester is highly hydrophilic, the moisture permeability and expansion coefficient due to moisture are excessively increased when the cellulose ester is formed into a film. To be more specific, the plasticizer has the effect of reducing the moisture permeability of the cellulose ester film and the moisture expansion coefficient.

However, the present inventors have made it clear that addition of the plasticizer causes a change in physical properties such as a drastic reduction in the glass-transition temperature and a drastic rise of thermal expansion coefficient.

As described above, a high resistance to heat and a low thermal expansion coefficient are essential to the film or display substrate. Accordingly, in the present invention, the amount of the plasticizer is kept below 1 percent. If the amount to be added is less than 1 percent, the aforementioned adverse effect on cellulose ester is minimized. This amount is more preferably 0.3 percent or less. It is most preferred that no plasticizer is added.

If the amount of the plasticizer to be added is as small as 1 percent or less, this will cause such an adverse effect as an increase in moisture permeability and moisture expansion coefficient. However, absorption and permeation of vapor can be controlled by forming a gas barrier in the cellulose ester film, as will be described later. This solves the problem when it is used as a substrate film for display. Further, formation of a gas barrier layer is essential, independently of the type of the plastic used for the substrate. It cannot be stated that the gas barrier layer is essential only because the cellulose ester is used for substrate film. Further, similarly to thermal expansion coefficient moisture expansion coefficient can be reduced by drawing operation, as will be described later.

The plasticizer that can be used in the present invention includes a polyvalent alcohol ester based plasticizer, glycolate plasticizer, phosphoric acid ester plasticizer and phthalic acid ester plasticizer.

To put it more specifically, it is possible to use butylphthalylbutylglycolate, ethylphthalylethylglycolate, methylphthalylethylglycolate, triphenylphosphate, tricresyl phosphate, cresyldiphenylphosphate, octyldiphenylphosphate, diphenylbiphenylphosphate, trioctylphosphate, tributylphosphate, diethylphthalate, dimethoxyethylphthalate, dimethylphthalate, dioctylphthlate, dibutylphthalate, di-2-ethylhexylphthalate, dicyclohexylphthalate, ehylphthalylethylglycolate, trimethylolpropanetribenzoate, pentaerithritoltetrabenzoate, dipentaerithritolpentabenzoate, etc. Two or more of these plasticizers can be mixed for use.

A low molecular compound having a specific function can be added to the cellulose ester film of the present invention, as required. Such a functional low molecular compound is exemplified by an ultraviolet absorber and retardation regulating agent used to ensure that the device inside the display substrate will not be deteriorated by ultraviolet rays; a dye used to adjust the color tone of the display substrate; and an oxidant inhibitor used to avoid oxidation of these functional materials.

These low molecular compounds are required to be not more than 1 percent by mass in terms of the sum total in the cellulose ester film.

In order to prevent the liquid crystal of a liquid crystal display apparatus from being deteriorated in an outdoor environment being exposed to the solar rays or the like, the ultraviolet absorber is required to have an excellent capacity of absorbing the ultraviolet rays having a wavelength of 370 nm or less, and to exhibit excellent liquid crystal display performances. For this purpose, the ultraviolet absorber that does not absorb the visible light having a wavelength of 400 nm or more is preferred used. In the present invention, light transmittance at a wavelength of 370 nm is preferably 10 percent or less, more preferably 5 percent or less, still more preferably 2 percent or less.

In the present invention, an ultraviolet absorber having two or more aromatic rings in a molecule is especially preferred.

There is no particular restriction imposed on the ultraviolet absorber used in the present invention. Such an ultraviolet absorber includes oxybenzophenone based compound, benzotriazole compound, salicylic acid ester compound, benzophenone compound, cyanoacrylate compound, triazine compound, nickel complex salt and inorganic powder. The preferably used ultraviolet absorber includes the benzotriazole ultraviolet absorber and benzophenone ultraviolet absorber that are highly transparent and highly resistant to deterioration due to liquid crystal device. Especially preferred is the benzotriazole ultraviolet absorber where unwanted coloring is minimized. Specific examples of the ultraviolet absorber preferably used in the present invention are 5-chloro-2-(3,5-di-sec-butyl-2-hydroxylphenyl)-2H-benzotriazole, (2-2H-benzotriazole-2-yl-6-(dodecyl of straight and side chains)-4-methylphenol, 2-hydroxy-4-benzyloxybenzophenone, 2,4-benzyloxybenzophenone, and Tinuvin such as Tinuvin 109, Tinuvin 171, Tinuvin 234, Tinuvin 326, Tinuvin 327 and Tinuvin 328 which are the products of Chiba Special Chemicals Inc. and are available on the market.

The ultraviolet absorber can be a mixture of two or more substances. A high molecular ultraviolet absorber is also used preferably as the ultraviolet absorber. Especially the polymer type ultraviolet absorber disclosed in the Official Gazette of Japanese Patent Tokkaihei 6-148430 is preferably used.

The method of adding the ultraviolet absorber is described below: One way is to dissolve the ultraviolet absorber in such an organic solvent as alcohol, methylene chloride and dioxolane. Then dope is added. Another way is to add it directly in the dope composition. In the case of the inorganic powder or the like that does not melt in the organic solvent, it is dispersed in the organic solvent and cellulose ester using a dissolver and sand mill, and then the dope is added.

The amount of the ultraviolet absorber to be used varies depending on the type of the compound and operating condition. If the thickness of the dried cellulose ester film is 30 through 200 μm, the excessive amount of ultraviolet absorber may act as a plasticizer. To avoid this, the amount of the ultraviolet absorber should be such that the linear expansion coefficient will not deteriorate; namely, the preferred amount is not more than 1 percent by mass, similarly to the case of the plasticizer.

Further, an oxidant inhibitor, anthraquinone based dyestuff for tincture adjustment and others can be added.

It is also possible to add the matting agent of fine particle including silicon oxide, and the fine particles of the matting agent such as the silicon oxide surface-treated by an organic substance. The matting effect will be greater when the average diameter of the fine particles is greater, while the smaller average diameter leads to better transparency. Thus, the average particle diameter of the fine particles is preferably 5 through 50 nm, and more preferably 7 through 20 nm.

There is no particular restriction to the fine particles of the silicon oxide. The examples are AEROSIL 200, 200V, 300, R972, R972V, R972CF, R974, R202, R805, R812, OX50 and TT600 by Nihon Aerosil Co., Ltd. Use of AEROSIL 200, 200V, R972, R972V, R974, R202, R805 and R812 is preferred.

Additives can be added to dope in batches. It is also possible to prepare an additive solution separately and to add it in line. In-line addition of part or whole of the matting agent is preferred in order to reduce the load on the filter medium.

To ensure better mixing with the dope during the in-line addition of the additive solution, a small amount of cellulose ester is preferably dissolved. The amount of cellulose ester is preferably 1 through 10 parts by mass, or more preferably 3 through 5 parts by mass, with respect to 100 parts by mass of solvent.

Such an in-line mixer as the Static Mixer (Toray Engineering Inc.) or SWJ (Hi-Mixer, a Toray Static type in-line mixer), for example, is preferably used for in-line addition and mixing in the present invention.

The transparent film of the present invention for a display substrate containing cellulose ester can be modified by a technique called organic/inorganic hybrid method. The organic/inorganic hybrid method provides a technique for creating a material having the properties of both the organic and inorganic substances, by mixing the organic substance with the inorganic substance.

In the present invention, the aforementioned cellulose ester is preferably used as the organic substance, while the inorganic high polymer obtained by hydrolysis and polycondensation of the alkoxysilane expressed in the aforementioned general formula (1) is preferably employed as the inorganic substance.

$$R_{4-n}Si(OR')_n \quad \text{General formula (1)}$$

When the inorganic high polymer obtained by hydrolysis and polycondensation of the alkoxysilane expressed in the aforementioned general formula (1) is expressed in the general formula (2), the inorganic high polymer is preferably contained in the amount of 1 through 20 percent by mass, relative to the entire film.

$$R_{4-n}SiO_{n/2} \quad \text{General formula (2)}$$

If the inorganic high polymer containing a large number of hydrophilic groups is added, hydrogen bondage between the cellulose ester molecules is tightened and the glass-transition temperature rises. However, if it is added in the amount over a predetermined level, the substrate film for display becomes brittle. To overcome this difficulty, the amount to be added is preferably not more than 20 percent by mass, more preferably not more than 3 through 15 percent by mass or still more preferably not more than 5 through 10 percent by mass.

If the amount to be added is within the aforementioned range, the transparent film for display substrate using the cellulose ester film modified by the organic/inorganic hybrid is provided with further preferable properties.

In the aforementioned general formula (1), R' denotes a hydrogen atom or a monovalent substituent, and "n" indicates 3 or 4.

The alkyl group represented by R' includes the methyl group, ethyl group, propyl group, butyl group, and methoxyethyl group. It can be replaced by the substituent (e.g. halogen atom, alkoxy group). The alkoxy group is desorbed by hydrolysis and polycondensation of the alkoxysilane to produce alcohol. A lower alkoxy group that volatilizes easily when dried is preferred. Especially methyl and ethyl groups are preferably used.

The monovalent substituent represented by R can be any compound that exhibits the properties of alkoxysilane. To put it more specifically, it includes alkyl group, cycloalkyl group, alkenyl group, aryl group, aromatic heterocyclic ring group, and silyl group. Among them, preferred examples are the alkyl group, cycloalkyl group and alkenyl group. They can be further replaced. The substituent of R includes a halogen atom such as fluorine atom and chlorine atom, amino group, epoxy group, mercapto group, hydroxyl group and acetoxy group. In particular, various substituents that do not lose the properties of alkoxysilane can be mentioned.

The specific examples of the preferably used alkoxysilane expressed in the general formula (1) are: tetramethoxysilane, tetraethoxysilane (TEOS), tetra n-propoxysilane, tetraisopropoxysilane, tetra n-butoxysilane, tetra t-butoxysilane, tetrakis(methoxyethoxy)silane and tetrakis(methoxypropoxy)silane. The examples further include: methyltrimethoxysilane, methyltriethoxysilane, ethyltrimethoxysilane, ethyltriethoxysilane, n-propyltrimethoxysilane, n-propyltriethoxysilane, n-butyltrimethoxysilane, i-butyltrimethoxysilane, n-hexyltrimethoxysilane, 3-glycidoxypropyltrimethoxysilane, 3-aminopropyltriethoxysilane, 2-(3,4-epoxycyclohexyl)ethyltrimethoxysilane, 3-chloropropyltrimethoxysilane, 3-mercaptopropyltrimethoxysilane, acetoxytriethoxysilane, (heptadecafluoro-1,1,2,2-tetrahydrodesyl)trymethoxysilane, (3,3,3-trifluoropropyl)trimethoxysilane, (3,3,3-trifluoropropyl)trimethoxysilane, and pentafluorophenylpropyltrimethoxysilane. The examples further include: vinyltrimethoxysilane, vinyltriethoxysilane, phenyltrimethoxysilane, vinyltrimethoxysilane, and vinyltriethoxysilane.

It is also possible to use the silicon compound of condensation products with several molecules such as Silicate 40 and Silicate 45, Silicate 48 and M Silicate 51 by Tama Chemical Co., Ltd., the silicon compound being formed by partial condensation of these compounds.

The aforementioned alkoxysilane has a silicon alkoxide group subjected to hydrolysis and polycondensation. Thus, a network structure of the inorganic high molecular compound is formed by hydrolysis and polycondensation of these forms of alkoxysilane. The alkoxysilane or the product of hydrolysis and polycondensation is made to undergo fine dispersion in the cellulose ester, thereby producing a transparent film having both the properties of the organic high polymer composed of cellulose ester and those of the inorganic high polymer formed by hydrolysis and polycondensation.

To put it more specifically, a hydrophilic organic solvent such as methanol, ethanol and acetonitryl is made to coexist in order to facilitate mixing of hydrophobic alkoxysilane and water, or the organic metal compound and water, as required. A catalyst is added if required, so that hydrolysis and polycondensation of alkoxysilane are carried out. Then the product of hydrolysis and polycondensation is added to the dope of the cellulose ester is mixed with it, thereby causing fine dispersion in the cellulose ester.

Further, the good solvent of the cellulose ester is preferably included in order to prevent cellulose ester from being precipitated out of the dope when alkoxysilane or the product of hydrolysis and polycondensation thereof are added to the dope of the cellulose ester.

From the viewpoint of productivity in film haze, flatness, film making speed and solvent recycling, water content for hydrolysis and polycondensation of alkoxysilane in the dope is preferably within the range of 0.01 or more without exceeding 2.0 percent by mass.

Use of a transparent film as a transparent support member improves the heat resistance without losing the optical characteristics of the cellulose ester, and provides a film impervious to deformation at a high temperature.

The aforementioned cellulose ester is used as the cellulose ester use in the transparent film whose major component is the cellulose ester and the product of hydrolysis and polycondensation of alkoxysilane. Acetyl cellulose is particularly preferred. As described above, the cellulose ester (Y>0) modified by the alkoxysilyl group capable of condensation reaction with the product of hydrolysis and polycondensation of alkoxysilane is also used preferably.

In the transparent film composed of the cellulose-silica hybrid polymer by the organic/inorganic hybrid of the present invention, a catalyst can be added to the alkoxysilane expressed in the aforementioned general formula (1) at the time of hydrolysis if required, so as to promote condensation reaction.

The catalyst used here includes: such inorganic acids as hydrochloric acid, sulfuric acid, nitric acid, phosphoric acid, dodecatungstophosphoric acid (VI), dodecamolybdophosphoric acid (VI) and tungstosilicic acid; and such organic acids as acetic acid, trifluoroacetic acid, levulinic acid, citric acid, p-toluenesulfonic acid and methanesulfonic acid. A base can be added to promote neutralization after sol-gel reaction processes subsequent to addition of acids. When the base is added to promote neutralization, the content of alkali metal is preferably below 5,000 ppm prior to the step of drying (where the alkali metal also includes the ionized substance). Further, Lewis acid, for example, metallic acetate such as germanium, titanium, aluminum, antimony and tin; other organic acids, halogenated compound, and phosphoric acid can be used in combination.

Instead of the aforementioned acids, the following can be used as a catalyst: ammonium, monoethanolamine, diethanolamine, triethanolamine, diethylamine and triethylamine; bicyclo ring based amine such as DBU (diazabicycloundecene-1) and DBN (diazabicyclononene); and a base such as ammonium, phosphine, alkali metal alkoxide, ammonium hydroxide, tetramethylammonium hydroxide and benzyltrimethylammonium hydroxide.

There is no particular restriction to the amount of the acid or alkali catalyst to be added. It is preferably 0.01 through 20 percent by mass relative to the amount of water to be added. Further, processing of acid and base can be used in combination several times. The catalyst can be neutralized, or the volatile catalyst can be removed by pressure reduction or by separation of liquid and washing by water. It is also possible to use such a solid catalyst as an ion exchange resin, which is convenient for removal of the catalyst.

The reaction of hydrolysis and polycondensation of alkoxysilane may be completed in the molten state prior to coating, or in a film-like form after casting. It is preferably completed prior to coating. Depending on the type of application, reaction need not be completed thoroughly, but it is preferably completed thoroughly wherever possible.

The cellulose ester film of the present invention can be modified by a crosslinking agent. Modification can be achieved by crosslinking by the compound whose molecule contains a plurality of reactive groups that bond with the residual hydroxy group by reaction. 1 through 20 percent by mass of such a crosslinking agent is preferably contained with respect to the entire cellulose ester film. This includes the crosslinking formed in the cellulose ester by reaction of the aforementioned reactive group with the residual hydroxyl agent of the cellulose ester.

If more than 20 percent by mass of the crosslinking agent is added, the film will be brittle and the amount of addition will exceed the equivalent of the residual hydroxyl group of the cellulose ester. Coloring may be caused by reaction with moisture in the air. Thus, addition of such an excessive amount should be avoided. Further, if the degree of crosslinking is low, heat resistance of the cellulose ester film cannot be improved. Not less than 1 percent by mass of the crosslinking agent is preferably added. Addition of 5 through 15 percent by mass of the crosslinking agent is more preferred.

This arrangement further improves the linear expansion coefficient. The reactive group that bonds with the residual hydroxyl group of cellulose ester by reaction is preferably an addition reactive group. To put it more specifically, it includes isocyanate group, thioisocyanate group, epoxy group and acid anhydride group. What is particularly preferred is a polyisocyanate compound containing a plurality of isocyanate groups crosslinkable with the cellulose ester.

The aforementioned polyisocyanate includes the compound expressed in the following general formula:

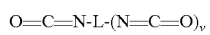  General formula

In the formula, v denotes 0, 1 or 2. L indicates a divalent bonding group containing the alkylene group, alkenylene group, arylene group or aralkyl group as a partial structure.

These groups may contain a further substituent. Preferred examples of the substituents are halogen (e.g. Br and Cl), hydroxyl group, amino group, carboxyl group, alkyl group and alkoxysilyl group.

They are exemplified by the isocyanate having an aromatic ring, such as 2,4-trilenediisocyanate (TDI), 4,4'-diphenyl-methanediisocianate (MDI) and xylylenediisocyanate; the aliphatic isocyanate such as n-butyldiisocyanate and hexamethylenediisocyanate; and the isocyanate with hydrogen added to the aromatic ring such as hydrogenated TDI and hydrogenated MDI. The examples also include Desmodur N100, Desmodur N3300, Mondur TD-80, Mondur M and Mondur MRS and polymer isocyanate by Mobey Inc.: Papi 27 by Dow Inc.; Octadecilisocyanate by Aldrich Inc.; Coronate 2030, Coronate 2255, Coronate 2513, Coronate 2507, Coronate L, Coronate HL, Coronate HK, Coronate HX, Coronate 341, Coronate MX and Coronate 2067 by Nippon Polyurethane Co., Ltd.; Takenate D103H, Takenate D204EA, Takenate D-172N and Takenate D-170N by Takeda Chemical Industries, Ltd.; and Sumujule N3200, Sumujule 44V-20 and Sumujule IL by Sumitomo Bayer Urethane Inc., without the present invention being restricted thereto.

The crosslinking agent other than the isocyanate compound includes: pyromellitic dianhydride, biphenyltetracarboxylic dianhydride, benzophenonetetracarboxylic dianhydride, diphenylsulfonetetracarboxylic dianhydride, ethylenediaminetetraacetic dianhydride, naphthalenetetracarboxylic dianhydride, cyclohexanetetracarboxylic dianhydride, and paraphenylenediisocyanate, without the present invention being restricted thereto.

Their amount of use is 1 through 20 percent, preferably 1 through 5 percent in terms of mass ratio, relative to cellulose ester film. If the amount is excessive, excessive crosslinking will result, and the product will be brittle. If the amount is insufficient, the advantages of the present invention cannot be provided.

The compound whose molecule contains a plurality of the reactive groups bonding with hydroxyl group by reaction is preferably added directly into the dope to be dissolved therein, or is added in the form of liquid dissolved in an organic solution, in order to ensure uniform mixing with the dope solution. It is also possible to prepare the solutions of these compounds separately, which are added into the dope solution immediately before being cast onto the belt or drum.

Especially when the crosslinking reaction is carried out quickly, it is also possible to perform sequential in-line addition immediately before the step of casting onto the belt or drum. This arrangement encourages crosslinking reaction on the belt or drum support member in the casting step, or in the web subsequent to separation.

The display substrate film containing the cellulose ester film of the present invention can be modified by the technique called the semi-IPN (semi-interpenetrating network structure) type polymer alloy method.

The IPN polymer alloy is composed of crosslinked polymers based on interpenetrating polymer network. The semi-IPN polymer alloy is made up of the crosslinked polymer and non-crosslinked polymer.

The semi-IPN polymer alloy can be produced by crosslinked polymerization of the monomer and/or oligomer for crosslinked polymer when the non-crosslinked polymer is dissolved. Alternatively, the semi-IPN polymer alloy can also be produced by non-crosslinked polymerization of the monomer when crosslinked polymer is swollen by the monomer and/or oligomer in the presence or absence of solvent. In the present invention, the crosslinked polymer and the non-crosslinked polymer are not required to be completely compatible. They can be phase-separated. Even when the crosslinked polymer and the non-crosslinked polymer are phase-separated, the crosslinked polymer rich phase and non-crosslinked polymer rich phase are formed in a semi-IPN structure. However, in the present invention, the crosslinked polymer and non-crosslinked polymer produced in a particulate form are not blended together. This can be verified by checking that much of the crosslinked polymer is not dispersed in a particulate form when the film of the present invention is dipped in the solvent for dissolving the non-crosslinked polymer.

The film composed of the semi-IPN polymer alloy has both the physical properties of excellent hardness and heat resistance as the properties of the crosslinked polymer, and the physical properties of flexibility and optical characteristics as the properties of the non-crosslinked polymer.

The non-crosslinked polymer of the present invention is a cellulose ester characterized by excellent transparency and low birefringence as well as positive waveform dispersion characteristics in birefringence.

There is no particular restriction to the cross linked polymer used in the semi-IPN polymer alloy. It is exemplified by epoxy resin, phenol resin, melamine resin, crosslinked vinyl polymer and polycyanulate. The cross-linked vinyl polymer characterized by excellent transmittance and heat resistance is preferably used. The crosslinked vinyl polymer is obtained by polymerization of the low-molecular compound through heating or applying an energy ray.

The low-molecular compound of the present invention refers to the compound that has a molecular weight of 1,000 or less and cannot be formed into a film as a simple substance.

The low-molecular compound containing a polymerized unsaturated double bond used in the present invention includes the low-molecular compound exemplified by the alkenyl group such as vinyl group and allyl group; and the unsaturated fatty acid residue such as acryl acid residue and methacryl acid residue.

There is no particular restriction to the polymerized unsaturated double bond used in the present invention. It preferably contains the functional group capable of interaction through hydrogen bond with cellulose ester in such a way that compatibility will be ensured, without generation of haze, bleeding out or volatilization, in the mixing phase prior to polymerization.

The aforementioned functional group includes: hydroxyl group, ether group, carbonyl group, ester group, carboxylic acid residue, amino group, imino group, amido group, cyano group, nitro group, sulfonyl group, sulfonic acid residue, phosphonyl group and phosphonic acid residue. The carbonyl group, ester group and phospholyl group are preferably used.

A low-molecular compound having an unsaturated fatty acid residue such as acrylic acid, methacrylic acid, undecylenic acid, oleic acid, sorbic acid, linolic acid, linolenic acid, arachidonic acid, and others is preferably used as the aforementioned functional group characterized by having a polymerized unsaturated double bond.

Further, the compound characterized by a high polymerization speed and curable by energy ray is preferred. Accordingly, the preferred compound is the low-molecular compound of the acryl and/or methacryl (also described as (meth) acryl: also applicable to (meth)acryl group, (meth)acrylate and (meth)acryloyl), namely, the compound containing the (meth)acryloyl group.

Esters between (meth)acrylic acid and polyvalent alcohol can be mentioned as the low-molecular compound, meeting the aforementioned conditions, capable of giving heat resistance to the cross-linked polymer, and containing a plurality of polymerized unsaturated double bonds preferably used in the present invention.

Esters between (meth)acrylic acid and polyvalent alcohol can be mentioned as the low-molecular compound, meeting the aforementioned conditions, capable of giving heat resistance to the cross-linked polymer, and containing a plurality of polymerized unsaturated double bonds preferably used in the present invention.

The polyvalent alcohol used in the present invention can be expressed in the following general formula (4):

$$R^1\text{---}(OH)_n \qquad \text{General formula (4)}$$

In this formula, $R^1$ indicates an n-valent organic group, n shows a positive integer representing 2 or more, OH group denotes an alcoholic group and/or phenolic hydroxyl group.

The following describes the examples of the preferably used polyvalent alcohol, without the present invention being restricted thereto:

Examples are adonitol, arabitol, ethylene glycol, diethylene glycol, triethylene glycol, tetraethylene glycol, 1,2-propanediol, 1,3-propanediol, dipropylene glycol, tripropylene glycol, 1,2-butanediol, 1,3-butanediol, 1,4-butanediol, dibutylene glycol, 1,2,4-butanetriol, 1,5-pentandiol, 1,6-hexanediol, hexanetriol, galactitol, mannitol, 3-methylpentane-1,3,5-triol, pinacol, sorbitol, trimethylolpropane, trimethylolethane and xylitol. Especially triethylene glycol, tetraethylene glycol, dipropylene glycol, tripropylene glycol, sorbitol, trimethylolpropane, and xylitol are preferable.

One type of the unsaturated carboxylic acid having a polymerized unsaturated double bond may be used for the polyvalent alcohol ester. Alternatively, two or more of the unsaturated carboxylic acids may be mixed for use. All the OH groups in the polyvalent alcohol can be esterified or some of these OH groups can be kept unchanged.

The following shows the specific compounds of the polyvalent alcohol unsaturated carboxylic acid ester:

[Chemical Formula 1]

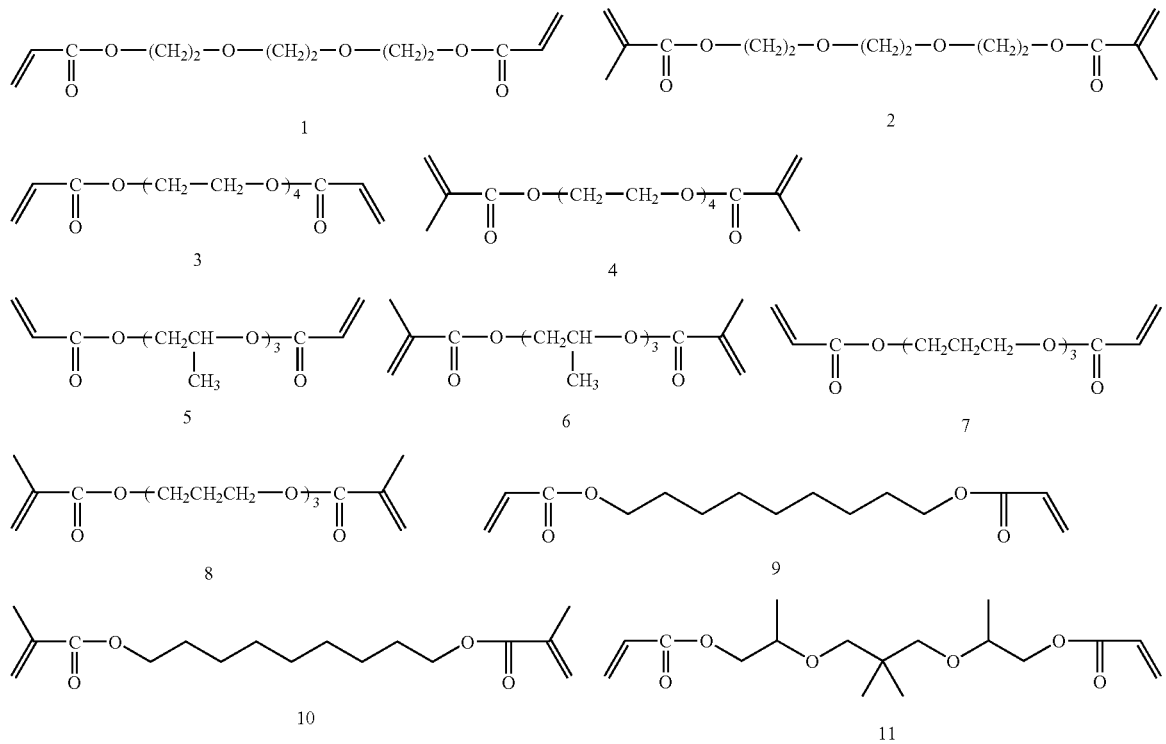

-continued
[Chemical Formula 2]
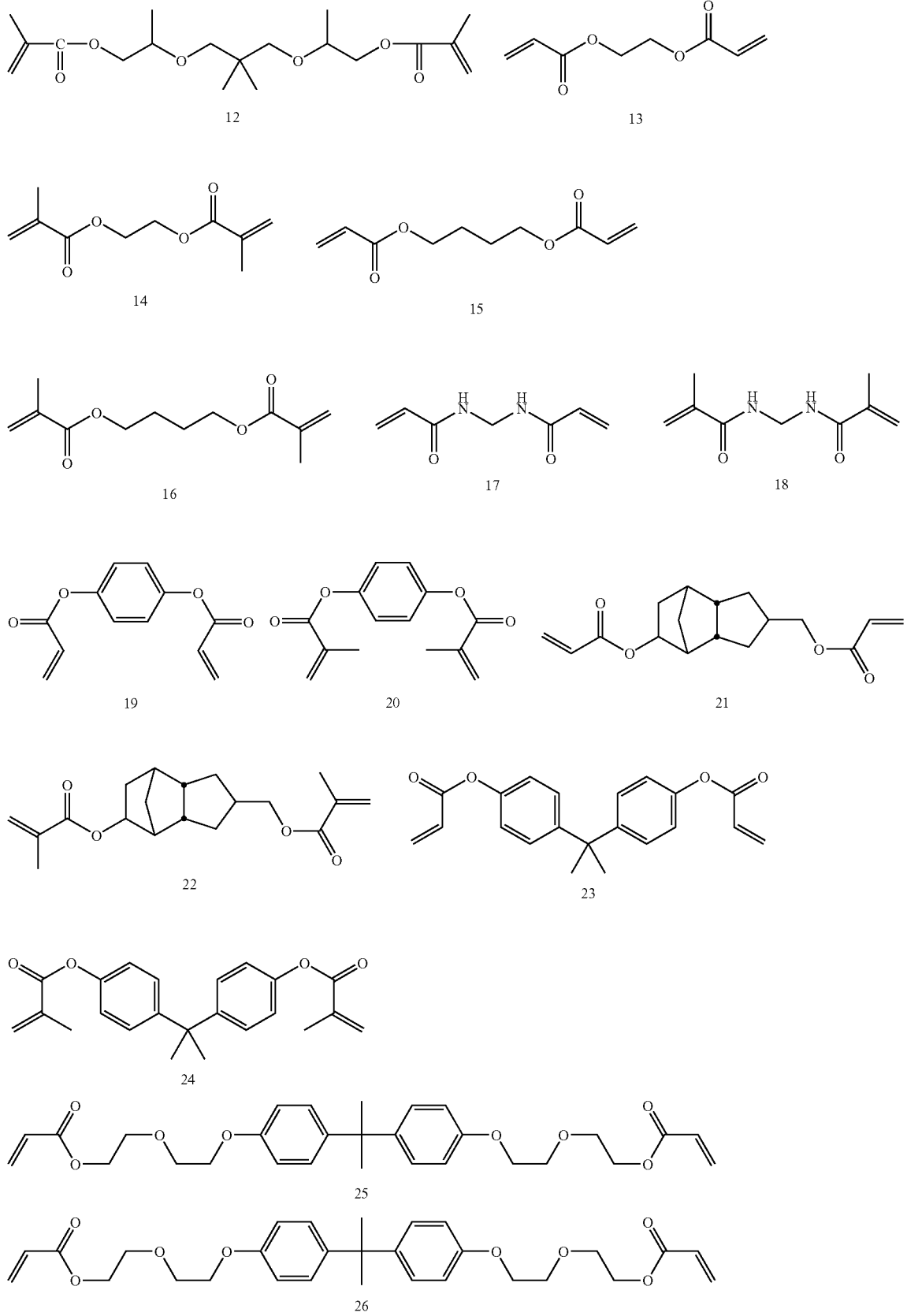

-continued
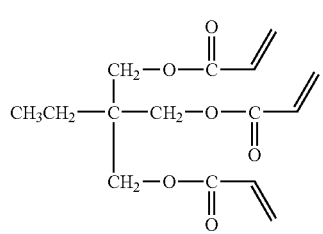
27
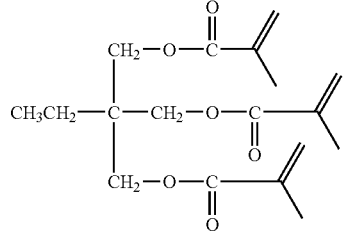
28
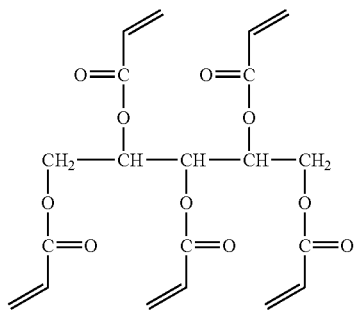
39
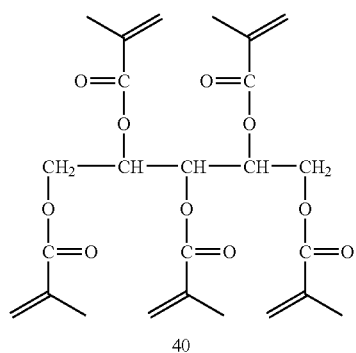
40
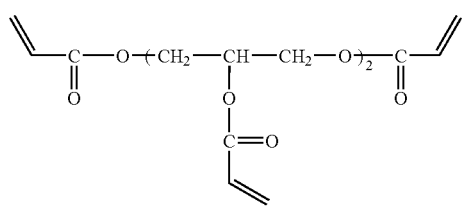
41
[Chemical Formula 3]
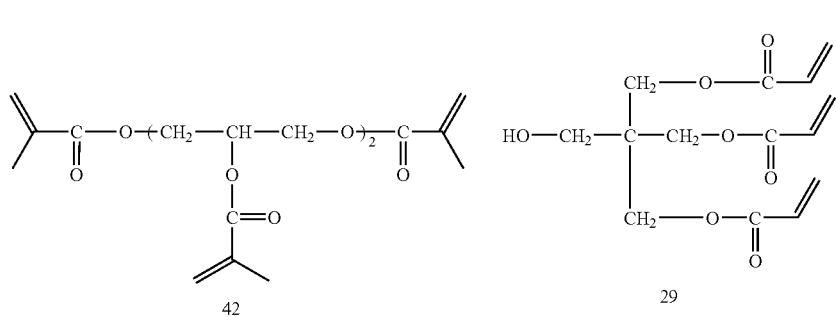
42            29
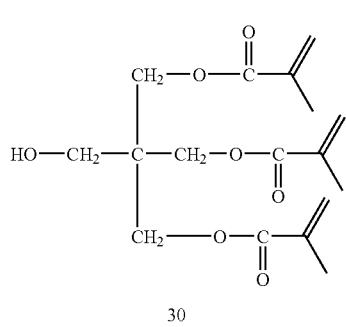
30
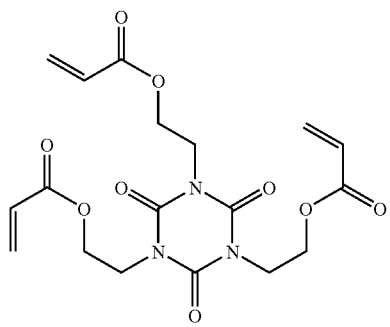
31

-continued
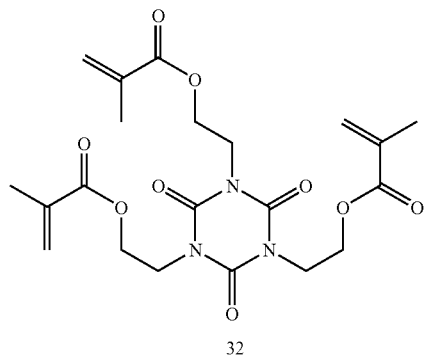
32
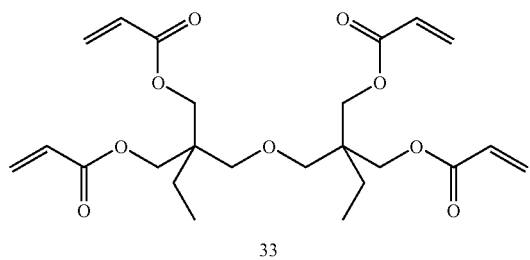
33
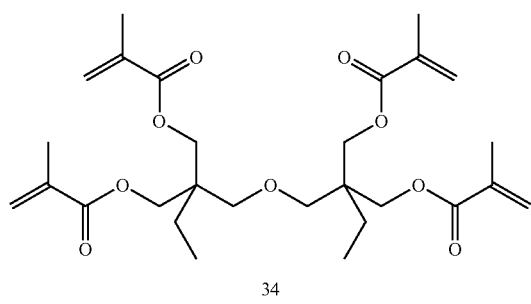
34
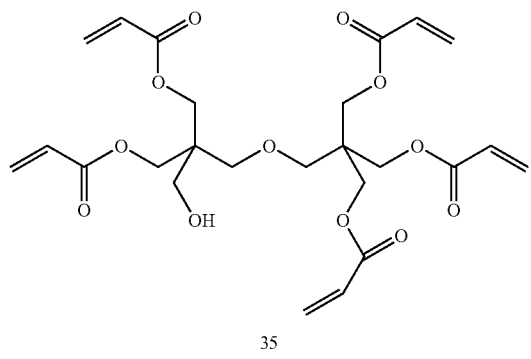
35
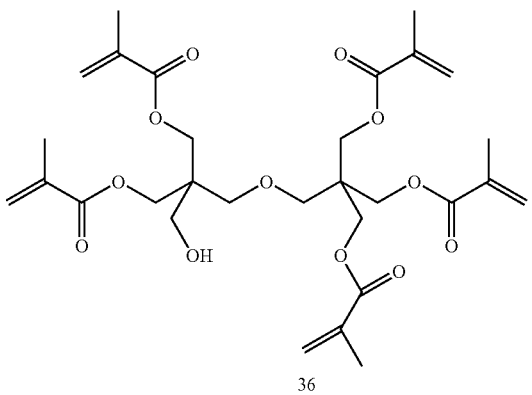
36
[Chemical Formula 4]
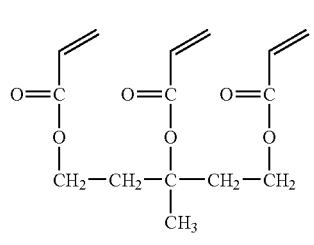
37
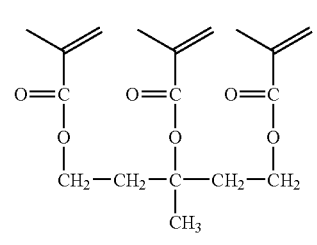
38
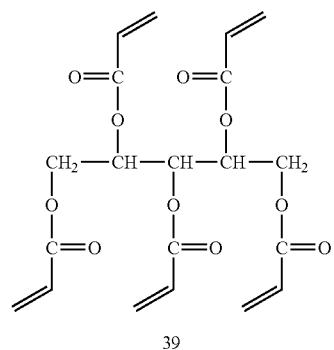
39

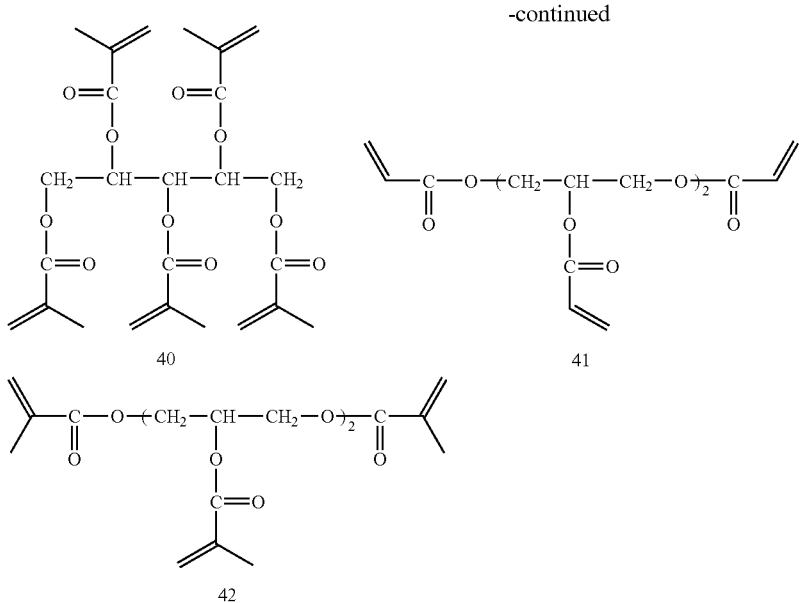

In addition to the above, the following compounds are also used preferably as the low-molecular compound having a plurality of polymerized unsaturated double bonds:

The examples are: divinylsulfone, divinylbenzene, 1,4-butandiolether, diallylamine, diallylsulfide, diallyldisulfide, diallylphthalate, triallyltriazine-2,4,6(1H, 3H, 5H)-trione, N,N'-1,3-phenylenedimaleimide, N,N'-1,4-phenylenedimaleimide, (3-acryloxypropyl)trimethoxysilane, allyltriethoxysilane, allyltriphenylsilane, (5-bicycloheptenyl)triethoxysilane, boronvinyldimethylsiloxide, butenyltriethoxysilane, divinyldimethylsilane, divinyltetramethyldisilane, 1,3-diallyltetramethyldisiloxane, 1,3-divinyl-1,3-diphenyl-1, dimethyldisiloxane, hexavinyldisiloxane, methacryloxyethoxytrimethylsilane, methacryloxypropylheptacyclopentyl-T8-sylsesquioxane, octavinyl-T8-sylsesquioxane, methacryloxypropylmethyldiethoxysilane, methacryloxypropyltrimethoxysilane, methacryloxypropyltris(vinyldimethylsiloxy)silane, pentavinylpentamethylcyclopentasiloxyne, styrylethyltrimethoxysilane, tetraallylsilane, tetraallyloxysilane, tetrakis(2-methacryloxyethoxy)silane, tetrakis(vinyldimethylsiloxy)silane, 1,1,3,3-tetravinyldimethyldisiloxane, tetravinylsilane, 1,3,5,7-tetravinyl-1,3,5,7-tetramethylcyclotetrasiloxane, trivinylethoxysilane, vinylmethyldimethoxysilane, 1-phenyl-1-trimethylsiloxyethylene, 2-trimethylsiloxy-4-allyloxydiphenylketone, tris(vinyldimethylsiloxy)methylsilane, trivinylethoxysilane, trivinylmethylsilane, trivinylsilane, 1,3,5-trivinyl-1,3,5-trimethylcyclotrisilazane, 1,3,5-trivinyl-1,1,3,3,5,5-pentamethyltrisiloxane, vinyltriacetoxysilane, vinyltriisopropenoxysilane, vinyltrimethoxysilane, aluminum acrylate, methacryloxytri-n-butyl tin, tetraallyl tin, boron vinyldimethylsiloxide, titanium allylacetoacetate triisopropoxide, titanium methacrylateisopropoxide, zirconium dimethacrylate dibutoxide, zirconium methacryloxyethylacetoacetate tri-n-propoxide, cupric methacryloxyethylacetoacetate, (metha)acrylic acid ester of epoxy resin, (metha)acrylic acid ester of polyester resin, (metha)acrylic acid ester of polyether resin, (metha)acrylic acid ester of polybutadiene resin, oligomer such as polyurethane resin having a (metha)acryloyl group on the molecular terminus.

The low-molecular compounds containing a polymerized unsaturated double bond can be used singly, or two or more of them can be mixed for use. The low-molecular compound containing one polymerized unsaturated double bond may be contained in the cross-linked polymer. To maintain the heat resistance of the cross-linked polymer, it is preferred that more than 50 percent by mass of the cross-linked polymer be composed of a plurality of low-molecular compounds containing a polymerized unsaturated double bond of the present invention.

The content of the cross-linked polymer of the present invention in the transparent film is preferably 5 through 50 percent by mass relative to the overall mass of the transparent film. If the amount of the cross-linked polymer is smaller than 5 percent by mass, the advantage of improving the heat resistance resulting from addition of the cross-linked polymer will not be provided, and the polymer tends to flow at the time of heating at a high temperature. This should be avoided. If the amount of the cross-linked polymer exceeds 50 percent by mass, since the transparent film will be brittle, it may be preferably 50% by mass or less.

In the semi-IPN polymer alloy film of the present invention, low-molecular compounds containing a polymerized unsaturated double bond of the present invention in the cellulose ester of the present invention can be cross-linked by any desired method. It is preferably cross-linked by application of an energy ray because of high polymerization speed and the need of heating for dissolution of cellulose derivative in the organic solvent.

The electron ray, gamma-ray, X-ray, ultraviolet ray, visible ray and infrared ray can be used as an energy ray. Especially the ultraviolet ray is preferably used due to the simple structure of the equipment and ease of handling. The intensity of the ultraviolet rays to be applied is preferably in the range from 0.1 through 5,000 mW/cm$^2$, more preferably in the range from 10 through 1,000 mW/cm$^2$. It can be applied for any span of time, but it is preferably applied for 0.1 through 100 seconds in many cases. When ultraviolet rays and visible rays are used as energy rays, a photo-polymerization initiator is preferably contained in order to increase the polymerization speed. Further, if the ultraviolet rays are applied in the atmosphere of inert gas, polymerization speed can be increased and the degree of polymerization can be improved.

A preferable photo-polymerization initiator is exemplified by a benzoyl derivative, a benzylketal derivative such as Ingacure 651, an α-hydroxyacetophenone derivative such as 1-hydroxycyclohexylphenylketone (Ingacure 184), and an α-aminoacetophenone derivative such as Ingacure 907.

An electron beam is another energy ray that is preferably used in the present invention. The electron beam is not affected by the ultraviolet absorbing effect of the solvent, coagulant solution and other additives. Use of the electron beam expands the scope of selecting these agents and improves the film making speed. It should be added that, when heating is used for cross-linked polymerization, polymerization initiator azobisisobutyronitril (AIBN) and benzoyl peroxide (BPO) is preferably added at a temperature higher than that in the casting step (−80 degrees Celsius) and lower than that in the drying step (−150 degrees Celsius).

In the semi-IPN polymer alloy, the precursor of the cross-linked polymer works as a plasticizer prior to starting the cross-linked polymerization. This facilitates drawing operation and permits drawing to be performed at a higher magnification than in the case of a common cellulose ester film. Conversely, after reaction of cross-linking, drawing cannot be performed. Thus, drawing operation is preferred carried out prior to crosslinking.

The following describes the method of manufacturing a cellulose ester film, an organic/inorganic hybrid film containing the cellulose ester or a semi-IPN polymer alloy.

The transparent film for display of the present invention is preferred formed on a mirror-finished support member by dissolving a cellulose ester and other additive independently or in a mixed organic solvent and by casting the dope obtained therefrom.

Before the step of casting, the cellulose ester is dissolved in the organic solvent. It can be dissolved under the normal pressure or added pressure. It can be dissolved by cooling (at 0 through 78 degrees Celsius) or by heating (at 40 through 150 degrees Celsius).

The film obtained by such casting production method is characterized by a high degree of flatness and is preferably used as a transparent film for display. An organic solvent ensuring effective dissolution of cellulose ester is called a good solvent. The organic solvent, having a major effect on the dissolution, used in great quantities is called a main (organic) solvent or major (organic) solvent.

Good solvents are exemplified by: ketone such as acetone, methylethyl ketone, cyclopentanone and cyclohexane; ethers such as tetrahydrofuran (THF), 1,4-dioxane, 1,3-dioxolane and 1,2-dimethoxyethane; esters such as methyl formate, ethyl formate, methyl acetate, ethyl acetate, amylacetate and γ-butyrolactone; methyl cellosolve, dimethyl imidazolinone, dimethyl formamide, dimethyl acetoamide, acetonitryl, dimethyl sulfoxide, sulfolane, nitroethane, methylene chloride, and dichloro ethane. Of these, 1,3-dioxolane, acetone, methyl acetate, and methylene chloride are preferred.

The dope preferably contains 1 through 40 percent by mass of the alcohol having a number of carbon atoms of 1 through 4, in addition to the aforementioned organic solvents. After the dope has been cast onto the metallic support member, the solvent starts to evaporate and the proportion of alcohol increases, thereby gelating the web (indicating the dope film after the dope of the cellulose derivatives has been cast onto the support member) so that a stronger web is created, and the web can be removed easily from the metallic support member. To achieve this, the aforementioned substance is used as a gelatinizer solvent. It is also used to promote the cellulose derivatives of the non-chlorine based organic solvent when this proportion is smaller, and to control the gelation, precipitation and increase of viscosity.

The alcohol with a number of carbon atoms of 1 through 4 is exemplified by: methanol, ethanol, n-propanol, iso-propanol, n-butanol, sec-butanol, tert-butanol, and propylene glycol monomethyl ether. Of these substances, ethanol is preferably used because it is characterized by excellent dope stability, lower boiling point, quick drying and lack of toxicity. These organic solvents independently do not dissolve cellulose derivatives, and are called poor solvents.

The most preferable solvent for dissolving the cellulose ester derivative as a preferred high molecular compound meeting the aforementioned requirements, to a high degree of concentration is the mixture solution wherein the ratio between methylene chloride and ethyl alcohol is 95:5 through 80:20.

The aforementioned additives can be added to dope in batches. It is also possible to prepare an additive solution separately and to add it in line. In-line addition of part or whole of the matting agent is preferred in order to reduce the load on the filter medium.

To ensure better mixing with the dope during the in-line addition of the additive solution, a small amount of cellulose ester is preferably dissolved. The amount of cellulose ester is preferably 1 through 10 parts by mass, or more preferably 3 through 5 parts by mass, with respect to 100 parts by mass of solvent.

Such an in-line mixer as the Static Mixer (Toray Engineering Inc.) or SWJ (Hi-Mixer, a Toray Static type in-line mixer), for example, is preferably used for in-line addition and mixing in the present invention.

In the aforementioned casting step, the dope is fed to the pressure die, and the dope is cast from the pressure die onto the casting support member (hereinafter referred to as "support member" in some cases) of an endless metallic belt for endless feed or a rotating metallic drum. Another casting method is a doctor blade method wherein the thickness of the cast dope film is adjusted by a blade. However, use of a pressure die such as a T-die or a coat hanger die is preferred because the form of the slit at the base portion can be adjusted and uniform film thickness can be obtained easily.

There are three methods to heat the web on the casting support member and to evaporate the solvent: The first method is to blow air from the web side; the second is to use a liquid to transfer heat from the back of the support member; and the third is to use the radiant heat to transfer heat. The second method of using a liquid to transfer heat from the back of the support member is preferably used. A combination of these methods is also used preferably.

The web from which solvent has been evaporated on the support member is separated at the position for separation. After that, the separated web is fed to the next process. If there is an excessive amount of the solvent remaining on the web at the time of separation, separation will be difficult. If the web is separated after having been dried sufficiently on the support member, part of the web will be separated in the middle of the operation.

To increase the film making speed, it is possible to use a gel casting method capable of separation despite the presence of excessive amount of residual solvent. Gelation is performed by after dope casting adding a poor solvent for cellulose ester into the dope. Alternatively, gelation is performed by reducing the temperature of the support member. If separation is carried out with a great deal of solvent still remaining, the flatness tends to be lost during separation, or a stretch or a longitudinal streak due to separation tension tends to appear if the web is soft. The amount of the residual solvent is determined according to the tradeoff between economical speed and quality.

In the drying process, the web is dried by a drier wherein the web is alternately passed through the rolls arranged in a staggered form and is fed, or a tenter apparatus wherein the web is fed with both ends of the web clipped by a clip. To dry the web, hot air is commonly blown to both faces of the web. Instead of air, microwave is also applied to the web. If the drying process is carried out too fast, the flatness of the film tends to be damaged. Drying at a high temperature is preferably started when the amount of residual solvent is 8 or less percent by mass. Generally, the drying temperature is 40 through 25 degrees Celsius, preferably 70 through 180 degrees Celsius, throughout the overall process. Drying conditions should be selected depending on the type and combination of the solvent to be used.

In the step of drying after the web has been separated from the casting support member, the web tends to shrink across the width by evaporation of solvent. As drying is carried out faster at a high temperature, shrinkage will be greater. To minimize this shrinkage during the process of drying is important in ensuring the superb flatness of the film to be produced. For this purpose, the method (tenter method) is preferred, wherein drying is carried out with both ends of the web held by a clip across the width throughout the drying process or in some portion of the drying process, as disclosed in the Official Gazette of Japanese Patent Tokkaisho 62-46625.

The method disclosed in the Official Gazette of Japanese Patent Tokkai 2003-55477 is preferably used in order to get a low linear expansion coefficient of a cellulose acetate film after having been dried, the low linear expansion coefficient being preferable for a transparent film for display substrate.

In the process of drawing, drawing is preferably performed in at least one direction. To get a low linear expansion coefficient in all the directions of the inner surface, biaxial orientation is more preferred. Biaxial orientation method is available in two types; simultaneous biaxial orientation and sequentialbiaxial orientation. From the viewpoint of ensuring continuous production, the sequential biaxial orientation is preferred. After the dope is cast to produce a film, the film is separated from a band or drum and is then drawn. If the amount of the residual solvent expressed in the following formula at the time of separation is excessive, the web will be difficult to separate. Conversely, if it is separated after having been dried sufficiently on the support member, part of the web may be separated in the middle. To avoid this problem, separation is preferably performed when the amount of the residual solvent is 10 through 120 percent by mass.

The temperature at the position of separation on the support member is preferably 10 through 40 degrees Celsius, more preferably 11 through 30 degrees Celsius. To facilitate separation, the amount of the residual solvent at the position of separation is preferably 20 through 100 percent by mass, more preferably 30 through 90 percent by mass.

Amount of the residual solvent=$\{(M-N)/N\}\times 100$ where M denotes the mass of the web (film containing solvent) at a desired time point, and N indicates the mass when the web M has been dried for 3 hours at a temperature of 120 degrees Celsius.

Drawing is preferably performed at least once in each of the longitudinal direction (MD) and transverse direction (TD). It is preferred that drawing be performed in the longitudinal direction after drawing in the transverse direction.

(1) Drawing in the TD Direction

Before drawing of the preheated film in the TD direction, the film is heated preferably at 50 or more without exceeding 150 degrees Celsius, more preferably at 60 or more without exceeding 140, still more preferably at 70 or more without exceeding 130. The film is preheated preferably for 5 seconds or more without exceeding 3 minutes, more preferably for 10 seconds or more without exceeding 2 minutes, still more preferably for 15 seconds or more without exceeding 90 seconds. Preheating is preferably carried out with the film held by a chuck in the tenter.

Drawing and preheating are followed by the step of drawing in the TD direction. The drawing speed is preferably 5 through 300 percent/minute, more preferably 15 through 150 percent. In the present invention, drawing at such a low speed is preferable. (The normal polymer film (e.g. polyester) is commonly drawn at a speed higher than 500 percent/minute). This drawing operation is performed preferably at 80 or more without exceeding 160 degrees Celsius, more preferably at 90 or more without exceeding 150 degrees Celsius, still more preferably at 100 or more without exceeding 145 degrees Celsius. Drawing is preferably carried out with both ends of the film held by a tenter. The stretch magnification is preferably 3 percent or more without exceeding 100 percent, more preferably 5 percent or more without exceeding 40 percent, still more preferably 7 percent or more without exceeding 35 percent, most preferably 10 percent or more without exceeding 30 percent. In the present invention, the film is preferably subjected to the following processing:

a) The film is drawn in the longitudinal direction of preferably by raising the film temperature in the range 10 or more without exceeding 30 degrees Celsius. The temperature to be raised is preferably 12 or more without exceeding 28 degrees Celsius, more preferably 15 or more without exceeding 25. As a higher degree of orientation is achieved by drawing, a smaller linear expansion coefficient is formed in the direction of drawing. A film of brittle polymer such as a cellulose acetate film tends to break during the step of drawing. In the transverse drawing, the film is gripped by a clip, and stress is concentrated on the gripped portion and the film tends to break. To ensure a high degree of orientation without allowing the film to break, the drawing is preferably performed by raising the temperature. Further, in the present invention, when there is a great deal of residual solvent and the film is plasticized, the film is drawn at a lower temperature. When the film temperature has risen and the solvent has evaporated, the film is drawing at a higher temperature. This arrangement ensures balanced drawing over the overall area on the inner surface of the film without allowing the film to break, with the result that a film having an improved linear expansion coefficient will be provided.

b) To avoid uneven linear expansion coefficient, after transverse drawing, the film tension is reduced and the film is shrunk preferably in the range from 1 percent or more without exceeding 20 percent, preferably in the range from 2 percent or more without exceeding 15 percent, preferably in the range from 4 percent or more without exceeding 12 percent, preferably at the drawing temperature of −50 degrees Celsius or more without exceeding the drawing temperature, more preferably at the drawing temperature of −40 degrees Celsius or more without exceeding the drawing temperature, still more preferably at the drawing temperature of −30 degrees Celsius or more without exceeding the temperature. This procedure will reduce the uneven drawing (bowing) having occurred in the transverse direction during drawing. This procedure requires preferably 5 seconds or more without exceeding 300 seconds, more preferably 10 seconds or more without exceeding 200 seconds, still more preferably 15 seconds or more without exceeding 100 seconds.

(2) Drawing in the MD Direction

Before the preheated film is drawn in the longitudinal direction, it is preheated preferably at 50 or more without exceeding 150 degrees Celsius, more preferably at 60 or more without exceeding 140 degrees Celsius, still more preferably at 70 or more without exceeding 130 degrees Celsius. The film is heated preferably for 5 seconds or more without exceeding 3 minutes, more preferably for 10 seconds or more without exceeding 2 minutes, still more preferably for 15 seconds or more without exceeding 90 seconds. Preheating is preferably carried out by feeding the film on the roll and/or in the heating tank.

The drawing speed of the film to be drawn is preferably 50 percent/minutes or more without exceeding 100 percent/minute, more preferably 80 percent/minutes or more without exceeding 800 percent/minute, still more preferably 100 percent/minutes or more without exceeding 700 percent/minute. The drawing temperature is preferably 115 or more without exceeding 160 degrees Celsius, more preferably 120 or more without exceeding 155 degrees Celsius, still more preferably 125 or more without exceeding 150 degrees Celsius. The stretch magnification is preferably 3 percent or more without exceeding 100 percent, more preferably 5 percent or more without exceeding 40 percent, still preferably 7 percent or more without exceeding 35 percent, most preferably 10 percent or more without exceeding 30 percent.

Dawning is preferably carried out by using a heat roll and/or radiant heat source (e.g. IR heater) or by using at least two nip rolls having different peripheral speeds (the peripheral speed at the outlet is higher than that at the inlet) while the film is heated in a thermostatic bath.

In the present invention, the film is preferably subjected to the following processing:

a) To avoid uneven linear expansion coefficient, the temperature for the roll (nip roll on the inlet side) immediately before drawing operation is preferably 70 or more without exceeding 160 degrees Celsius, more preferably 75 or more without exceeding 140 degrees Celsius, still more preferably 80 or more without exceeding 120 degrees Celsius. Generally, this roll temperature is set at Tg or more. The cellulose acetate film containing the residual solvent tends to stick to the nip roll, and the wrinkles resulting therefrom produces uneven drawing. If the temperature of the roll immediately before drawing is set at Tg or less, it is possible to prevent the film from sticking to the roll.

b) To avoid uneven linear expansion coefficient, drawing is carried out when the spacing between drawing rolls is set preferably at 3 or more without exceeding 8 times the base width, more preferably at 3.5 or more without exceeding 7.5 times, still more preferably at 4 or more without exceeding 7 times. Normally, drawing is carried out with the spacing set at not more than 2 times the base width. Such a small spacing cannot provide sufficiently molecular orientation, and therefore, cannot reduce the linear expansion coefficient sufficiently. In the present invention, to provide sufficiently strong molecular orientation and to reduce the linear expansion coefficient, drawing is preferably carried out between the rolls having the aforementioned long span.

c) The temperature at the end of the film is preferably 10 or more without exceeding 30 degrees Celsius lower than that at the center, more preferably 13 or more without exceeding 27 degrees Celsius lower than that at the center, still more preferably 15 or more without exceeding 2 degrees Celsius lower than that at the center. This arrangement reduces the uneven drawing caused by excessive drawing force applied to the end. This method tends to produce uneven drawing especially in the transverse direction, when drawing is carried out using the aforementioned long span. It is particularly important to perform the operation in combination therewith. To provide such temperature distribution on the film, a radiant heat source (IR heater and halogen heater) can be used to heat the end alone locally, or a split heater is incorporated in the nip roller, thereby producing a temperature difference.

After drawing at a reduced tension, the film tension can be reduced while the film is cooled. In the cooling process, the drawing temperature is reduced gradually using two or more steps of temperature regulating rolls. In this case, the difference of temperatures of adjacent rolls is preferably 50 degrees Celsius or less. If quick cooling is performed over this level, wrinkles will appear on the film to cause uneven drawing, with the result that moisture expansion coefficient of the film will be uneven. It is a preferred practice to reduce the peripheral speed of the temperature regulating roll at the outlet side during this time, thereby reducing the film tension. The amount of reducing the film tension is preferably 10 percent or less, more preferably 7 percent or less, still more preferably 5 percent or less.

If the transparent film for display to be manufactured is the cellulose ester and semi-IPN polymer alloy such as crosslinked (meth)acrylate, the drawing operation is preferably carried out prior to polymerization of a (meth)acrylate monomer. Accordingly, subsequent to drawing, activated radiation is applied for polymerization of (meth)acrylate monomer.

As described above, the cellulose ester film wherein the amount of plasticizer to be added is less than 1 percent is formed by casting film making method, and the film is drawn both in the direction of conveyance and in the transverse direction. This arrangement provides a transparent film for display substrate wherein glass-transition temperature is 180 degrees Celsius and more, and thermal expansion coefficient is in the range from 5 through 50 ppm/degrees Celsius. Thus, the crystalline transparent conductive film of low resistance can be formed on the transparent film for display substrate of the present invention. Further, the thermal expansion coefficient is 50 ppm/degrees Celsius or less. This reduces the possible deterioration before or after the process of manufacturing the functional thin film such as gas barrier layer and transparent conductive layer.

It should be added that the glass-transition temperature is 200 degrees Celsius or more and the thermal expansion coefficient is 5 through 30 ppm/degrees Celsius.

<Moisture Proof Film>

To reduce the vapor transparency, the transparent film for display substrate of the present invention preferably has the coatings made of metallic oxide, metallic nitride, metallic oxynitride and metallic carbide formed as a moisture proof film on at least one side of the transparent film. These coatings may be laminated or may be formed on both sides.

In the cellulose ester film of the present invention, the amount of the plasticizer for reducing the moisture expansion coefficient is kept at as small as less than 1 percent by mass. Accordingly, the aforementioned coatings are more preferably formed on both sides. A gas barrier is formed on both sides of the cellulose ester film. This arrangement virtually removes the moisture absorbing capacity of the cellulose ester film, whereby the moisture expansion coefficient is reduced and the disadvantages resulting from scarcity of the plasticizer are minimized.

The oxide, nitride, carbide and oxynitride composed of more than one element selected from the silicon, zirconium, titanium, tungsten, tantalum, aluminum, zinc, indium, chromium, vanadium, tin and niobium can be mentioned as the metallic oxide, metallic nitride and metallic oxynitride. Use of silicon oxide, aluminum oxide, silicon nitride and silicon carbide are preferred, and the metallic oxide mainly composed of silicon oxide is particularly preferred. The term "mainly composed of" signifies that the content in the component of the moisture proof film is 80 percent by mass or more.

The metallic oxide, metallic nitride and metallic oxynitride can be produced, for example, by vapor deposition, sputtering and ion plating. Use of the plasma discharge method under atmospheric pressure to be described later is preferred. According to the plasma CVD method under atmospheric pressure, the reaction is carried out under atmospheric pressure that is a very high pressure. Thus, the mean free path of the fine particle forming the inorganic thin film is short and a very flat film can be obtained, so that a high gas barrier property is ensured.

Further, as disclosed in: J. Sol-Gel Sci. Tech., P. 141 through 146 (1998), the thin film of the metallic oxide, metallic nitride, metallic oxynitride and metallic carbide is susceptible to a crack, and vapor leaks from the crack. To prevent this, various types of coating materials are applied onto the moisture proof film of the metallic oxide, metallic nitride and metallic oxynitride, whereby the crack is sealed to reduce moisture permeability.

<Transparent Conductive Film>

The following describes the transparent conductive film:

The transparent conductive film of the present invention is commonly known as an industrial material. It hardly absorbs visible light (400 through 700 nm) and provides a superb conductor film. The transmission characteristic of the free charging member for carrying electricity is high in the visible light area. The film is transparent and has a high degree of electric conductivity, and therefore, is used as a transparent electrode for display such as the organic electroluminescence display apparatus and liquid crystal display apparatus. When the transparent conductive film is used as the display transparent electrode, the thickness of the transparent conductive film is preferably about 100 through 140 nm for the tradeoff between the film strength and surface resistivity.

The transparent conductive film is exemplified by a composite oxide film composed of a metallic oxide film of $SnO_2$, $In_2O_3$, CdO, $ZnO_2$, $SnO_2$, Sb, $SnO_2$, F, ZnO, Al, $In_2O_3$ and Sn, and dopant.

The composite oxide film made of dopant includes the ITO film obtained by doping tin into indium oxide, and the FTO film obtained by doping fluorine into tin oxide, as well as the IZO film composed of $In_2O_3$—ZnO amorphous substance.

Such a transparent conductive film can be formed by the wet type film formation method represented by coating method, or the dry type film formation method such as sputtering, vapor deposition and ion plating, for example. To form a transparent conductive film on the conductive film of the present invention, a plasma discharge method under atmospheric pressure characterized by a simple film making process is preferably used.

<Plasma Discharge Method Under Atmospheric Pressure>

In the plasma discharge method under atmospheric pressure, an electric field is produced between opposing electrodes under atmospheric pressure or under pressure close to atmospheric pressure so that the reactive gas between the electrodes is formed in a state of plasma. Then the substrate is exposed to the reactive gas in the state of plasma, whereby a film is formed on the substrate.

In the present invention, the pressure close to atmospheric pressure denotes the pressure from 20 through 110 kPa. Use of 93 through 104 kPa is preferred.

The following describes an example of the apparatus and method for plasma discharging under atmospheric pressure wherein the transparent conductive film of the present invention is formed on the cellulose ester film of the present invention (hereinafter referred to as "substrate film").

<The Plasma Discharge Apparatus Under Atmospheric Pressure>

The plasma discharge apparatus under atmospheric pressure has a roll electrode as a ground electrode and a plurality of fixed electrodes as applicators arranged at an opposed position. Discharging is carried out between these electrodes so that the inert gas introduced between these electrodes and the reaction gas containing reactive gas are formed in a state of plasma. The substrate film rotated and fed by the roll electrode is exposed to the reaction gas in the state of plasma, whereby a moisture proof film and conductive film are formed on the film.

According to a jetting method, the substrate film is placed close to the electrode—not between electrodes—, and is fed. The plasma having occurred is blown onto the substrate film so that a thin film is formed.

FIG. 1 is a drawing representing an example of the plasma discharge apparatus under the atmospheric pressure of the present invention or the pressure close to it. The apparatus in FIG. 1 is composed of a plasma discharge apparatus 30, a gas charging section 50, a voltage application section 40, an electrode temperature regulating section 60. A roll rotating electrode 35 and rectangular fixed electrode group 36 are used for plasma discharging of the substrate film CF. The substrate film CF is unwound from the master roll (not illustrated) and is fed. Alternatively, the substrate film CF is fed from the previous step passes through a guide roll 64. Air and others entrained by the substrate film is blocked by the nip roll 65. The film is wound and rotated in contact with the roll rotating electrode 35 and is fed between the rectangular fixed electrode group 36. It goes through a nip roll 66 and a guide roll 67 and is wound up by a winder (not illustrated) to be fed to the next step. A gas charging section 50 controls the flowrate of the reaction gas G generated from the gas generator 51, and the gas is fed into the plasma discharge container 31 of a discharge chamber 32 through the air inlet 52, so that the plasma discharge container 31 is filled with the reaction gas G. The waste gas G' is removed from the exhaust port 53. Then voltage is applied to the rectangular fixed electrode group 36 by the voltage application section 40 through a high frequency power source 41. The roll rotating electrode 35 is grounded by means of a wire, and a discharge plasma is produced between electrodes. The electrode temperature regulating section 60 heats or cools the liquid medium and sends into the roll rotating electrode 35 and rectangular fixed electrode group 36. The medium the temperature of which has been regulated by the electrode temperature regulating section 60 is fed through a pipe 61 by a liquid feed pump P, and the temperature is controlled from inside the roll rotating electrode 35 and rectangular fixed electrode group 36.

The physical properties and composition of the thin film obtained from the temperature of the substrate film may be subjected to change at the time of plasma discharging. Adequate measures should be taken to control this change. Such an insulating material as distilled water and oil is preferably used as the medium. In the step of plasma discharging, the temperature inside the rotating electrode using a roll is preferably controlled in order to avoid the uneven temperature of the substrate film in the transverse or longitudinal direction. It should be added that numerals 68 and 69 indicate a partition plate for separating the plasma discharge container 31 and the outside world.

The reaction gas used for discharging plasma is led to the plasma discharge container 31 from the air inlet 52. After processing, the gas is discharged from the exhaust port 53.

Figure 2:
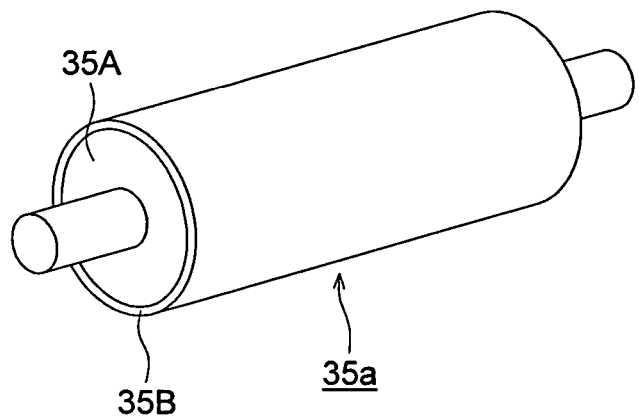
FIG. 2 is a sketch representing an example of the structure of the conductive base material of the metal of a roll electrode or the like and the dielectric covering the same.

FIG. 2 is a sketch representing an example of the structure of the conductive base material of the metal of a roll electrode or the like and the dielectric covering the same.

In FIG. 2, the roll rotating electrode 35*a* as a ground electrode is a combination structure coated with a ceramic-coated dielectric 35B provided with pore sealing treatment using the pore sealing material of an inorganic compound, subsequent to spraying of a ceramic, as an dielectric coated layer for the conductive base material 35A. It is coated with the ceramic coated dielectric with a thickness of 1 mm on one side, and is connected to the ground. Alumina/silicon nitride and others are preferably used as the ceramic material used for spraying. In particular, alumina is more preferably used because it is characterized by easy processing.

The lined dielectric equipped with an inorganic material by a glass lining can be used as the dielectric layer.

The conductive base material 35A of metal or the like includes: metals such as titanium metal, titanium alloy, silver, platinum, stainless steel, aluminum and iron, and a composite material between iron and ceramic; and a composite material between aluminum and ceramic. From the viewpoint of electrode stability, titanium metal or titanium alloy is preferably used.

The details of the conductive base material and dielectric will be described later.

Figure 3:
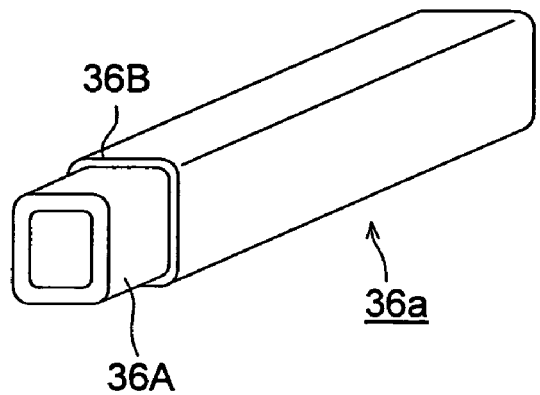
FIG. 3 is a sketch representing an example of the structure of the base material of the rectangular fixed electrode as an applicator wherein one of the rectangular fixed electrode group has been picked up, and the structure of the dielectric covering the same.

FIG. 3 is a sketch representing an example of the structure of the base material of the rectangular fixed electrode as an applicator wherein one of the rectangular fixed electrode group has been picked up, and the structure of the dielectric covering the same.

In FIG. 3, the rectangular electrode group 36*a* has the same dielectric coating layer 36B as that shown in FIG. 2, for the conductive base material 36A such as a metal. To be more specific, the same dielectric as the above is coated on the hollow metallic pipe. Cooling by cooling water can be made during the discharging operation. Fourteen rectangular fixed electrodes are installed along the circumference greater than that of the roll electrode.

The rectangular electrode shown in FIG. 3 has the effect of increasing the range of discharge (discharge range) as compared to the cylindrical electrode, and is preferably used according to the thin film forming method of the present invention.

There is no particular restriction to the power source for applying voltage to the applicator. It is also possible to the power source for oscillating the high frequency power source (3 kHz) by Shinko Electric Co., Ltd., high frequency power source (5 kHz) by Shinko Electric Co., Ltd., high frequency power source (15 kHz) by Shinko Electric Co., Ltd., high frequency power source (50 kHz) by Shinko Electric Co., Ltd., frequency variable high frequency power source by Heiden Research Institute (continuous mode (2.5 through 100 kHz), high frequency power source by Pearl Industry Co., Ltd. (200 kHz), high frequency power source by Pearl Industry Co., Ltd. (80 kHz), high frequency power source by Pearl Industry Co., Ltd. (2 MHz), high frequency power source by Nippon Electric Co., Ltd. (13.56 MHz), high frequency power source by Pearl Industry Co., Ltd. (27 MHz) and high frequency power source by Pearl Industry Co., Ltd. (150 MHz). It is also possible to use the power source for oscillating 433 MHz, 800 MHz, 1.3 GHz, 1.5 GHz, 1.9 GHz, 2.45 GHz, 5.2 GHz and 10 GHz. There may be a difference in the frequency capable of exciting the molecular in the mixed gas, and therefore, two or more frequencies can be superimposed.

The preferred combination in this case is the superimposition of a 1 kHz through 1 MHz power source and a 1 MHz through 2.5 GHz power source.

The distance between the aforementioned electrodes is determined with consideration given to the thickness of the solid dielectric provided on the conductive base material of the electrode, the magnitude of the applied voltage and the purpose of using the plasma. The shortest distance between the surface of the dielectric and the electrode when one of the aforementioned electrodes is equipped with the dielectric, and the distance between the surfaces of the dielectrics when both of the aforementioned electrodes are equipped with dielectrics are preferably 0.5 through 20 mm in either case, preferably in particular 1±0.5 mm, from the viewpoint of ensuring uniform discharging.

The voltage value applied by the power source 41 to the rectangular fixed electrode group 36 is determined as appropriate. For example, when the voltage is about 10 through 10 kV, the power source frequency is adjusted to more than 100 kHz without exceeding 150 MHz. For the power source application method, either the continuous sine waveform continuous oscillation mode called the continuous mode, or the intermittent oscillation mode for intermittent ON/OFF operation called the pulse mode can be selected. However, the continuous mode will provide a more compact and higher-quality film.

A pyrex (R) glass-made processing vessel is preferably used as the plasma discharge container 31. If insulation with the electrode can be secured, use of the metallic product is also possible. For example, an inner surface of the aluminum or stainless steel frame may be lined with a polyimide resin. Ceramic spraying may be applied to the metallic frame to provide insulation.

Further, to minimize impact on the substrate film in the step of discharge plasma processing, the temperature of the substrate film in the step of discharge plasma processing is preferably adjusted within the range from the normal temperature (15 through 25 degrees Celsius) to 300 degrees Celsius. For adjustment within the aforementioned range, the electrode and substrate film is subjected to discharge plasma processing while being cooled or heated by a temperature adjusting device, if required.

<Reaction Gas>

The following describes the reaction gas for forming a moisture proof film on the transparent film for display substrate of the present invention. The reaction gas to be used is basically composed of an inert gas and a reactive gas for forming a thin film.

The reaction gas to be used is a gas mixture containing an inert gas and reactive gas. The inert gas is a Group 18 element in the Periodic Table. To put it more specifically, it includes a rare gas such as helium, neon, argon, krypton, xenon and radon, or nitrogen. To get the advantages of the present invention, helium, argon and nitrogen are preferably used. To form a compact and high-quality thin film, use of argon as a rare gas is most preferred. It can be estimated that high-density plasma is generated more easily if argon is used. 90.0 through 99.0 percent by volume of argon gas is preferably contained with respect to 100 percent by volume of a reaction gas (gas mixture composed of a rare gas and reactive gas).

To form a moisture proof thin film, the reaction gas to be used is basically composed of an inert gas and a reactive gas for forming a thin film. 0.01 through 10 percent by volume of reactive gas is preferably contained with respect to the reaction gas. The thin film having a thickness from 0.1 through 1,000 nm is obtained.

The reactive gas is formed in a state of plasma in the discharge space, and contains:

the components for forming a thin film, which include the compounds for forming a thin film such as an organic metallic compound, organic compound, inorganic compound; and optionally, gases for supplementary use such as hydrogen gas, oxygen gas and carbon dioxide.

<Reactive Gas for Forming a Moisture Proof Film>

Any compound can be used as the reactive gas for forming a moisture proof film if it is capable of providing an adequate moisture proof property. A titanium compound, tin compound, silicon compound, fluorine compound, silicon compound containing fluorine or a mixture of these compounds can be used preferably. Of them, the silicon compound is most preferably used.

It can be a gas a liquid and a solid under normal temperature and normal pressure. When it is a gas, it can be introduced directly into the discharge space. If it is a liquid or a solid, it is turned into a gas by heating, bubbling, pressure reduction, ultrasonic irradiation or the like before it is used. Further, it can be used after being diluted by a solvent. In this case, an organic solvent such as methanol, ethanol and n-hexane and the solvent mixture thereof can be used as the solvent. Such a diluted solvent in the plasma discharge processing is decomposed into molecules and atoms, and therefore, their impact can be ignored almost completely.

However, it is preferably a compound having a vapor pressure in the temperature range of 0 through 250 degrees Celsius under atmospheric pressure, more preferably a compound in a liquid state in the temperature range of 0 through 250 degrees Celsius. This is because the pressure in the plasma film making chamber is close to the atmospheric pressure, and a gas can be introduced in the plasma film making chamber only under the atmospheric pressure. Further, when the material compound is in a state of liquid, the amount to be introduced into the plasma film making chamber can be placed under more accurate control.

Compounds containing silicon as one of such organic metallic compounds are exemplified by: silane, tetramethoxysilane, tetraethoxysilane, tetra n-propoxysilane, tetraisopropoxysilane, tetra n-butoxysilane, tetra t-butoxysilane, dimethyldimethoxysilane, dimethyldiethoxysilane, diethyldimethoxysilane, diphenyldimethoxysilane, methyltriethoxysilane, ethyltrimethoxysilane, phenyltriethoxysilane, (3,3,3-trifluoropropyl)trimethoxysilane, hexamethyldisiloxane, hexamethylcyclotrisiloxane, tetramethylcyclotetrasiloxane, octamethylcyclotetrasiloxane, bis(dimethylamino)dimethylsilane, bis(dimethylamino)methylvinylsilane, bis(ethylamino)dimethylsilane, N,O-bis(trimethylsilyl)acetoamido, bis(trimethylsilyl)carbodiimide, diethylaminotrimethylsilane, dimethylaminodimethylsilane, hexamethyldisilazane, hexamethylcyclotrisilazane, heptamethyldisilazane, nonamethyltrisilazane, octamethylcyclotetrasilazane, tetrakisdimethylaminosilane, tetraisocyanatesilane, tetramethyldisilazane, tris(dimethylamino)silane, triethoxyfluorosilane, allyldimethylsilane, allyltrimethylsilane, benzyltrimethylsilane, bis(trimethylsilyl)acetylene, 1,4-bistrimethylsilyl-1,3-butadiene, di-t-butylsilane, 1,3-disilabutane, bis(trimethylsilyl)methane, cyclopentadienyltrimethylsilane, phenyldimethylsilane, phenyltrimethylsilane, propargyltrimethylsilane, tetramethylsilane, trimethylsilylacetylene, 1-(trimethylsilyl)-1-propyne, tris(t-rimethylsilyl)methane, tris(trimethylsilyl)silane, vinyltrimethylsilane and hexamethyldisilane.

The compounds containing titanium are exemplified by: titanium methoxide, titanium ethoxide, titanium isopropoxide, titanium n-butoxide, titanium diisopropoxide(bis-2,4-pentanedionate), titanium diisopropoxide(bis-2,4-ethylacetoacetate), titanium di-n-butoxide(bis-2,4-pentanedionate), titanium acetylacetonate, and butyl titanate dimer.

The compounds containing zirconium are exemplified by: zirconium n-propoxide, zirconium n-butoxide, zirconium t-butoxide, zirconium tri-n-butoxideacetylacetonate, zirconium di-n-butoxidebisacetylacetonate, zirconium acetylacetonate, zirconium acetate, and zirconium hexafluoropentanedionate.

The compounds containing aluminum are exemplified by: aluminum ethoxide, aluminum isopropoxide, aluminum n-butoxide, aluminum s-butoxide, aluminum t-butoxide, aluminum acetylacetonate, triethyldialuminum tri-s-butoxide, and trimethylamine-alane.

The compounds containing boron are exemplified by: diborane, tetraborane, boron fluoride, boron chloride, boron bromide, borane-diethylether complex, borane-THF complex, borane-dimethylsulfide complex, boron trifluoride diethyl ether complex, triethyl borane, trimethoxyborane, triethoxyborane, tri(isopropoxy)borane, borazol, trimethylborazole, triethylborazole, and triisopropylborazole.

The compounds containing tin are exemplified by: tetraethyl tin, tetramethyl tin, diacetate di-n-butyl tin, tetrabutyl tin, tetraoctyl tin, tetraethoxy tin, methyltriethoxy tin, diethyldiethoxy tin, triisopropylethoxy tin, diethyl tin, dimethyl tin, diisopropyl tin, dibutyl tin, diethoxy tin, dimethoxy tin, diisopropoxy tin, dibutoxy tin, tin dibutyrate, tin diacetoacetonate, ethyl tin acetoacetonate, iethoxy tin acetoacetonate and other such related dimethyl tin diacetoacenate. The tin hydrogen compound is exemplified by halogenated tin dichloride and tin tetrachloride.

The compounds made of other metals are exemplified by: antimony ethoxide, arsenic triethoxide, barium 2,2,6,6-tetramethylheptanedionate, beryllium acetylacetonate, bismuth hexafluoropentanedionate, dimethylcadmium, calcium 2,2,6,6-tetramethylheptanedionate, chromium trifluoropentanedionate, cobalt acetylacetonate, copper hexafluoropentanedionate, magnesium hexafluoropentanedionate-dimethylether complex, gallium ethoxide, tetraethoxygermane, tetramethoxygermane, hafnium t-butoxide, hafnium ethoxide, indium acetylacetonate, indium 2,6-dimethylaminoheptanedionate, ferrocene, lanthanum isopropoxide, lead acetate, tetraethyl lead, neodymium acetylacetonate, platinum hexafluoropentanedionate, trimethylcyclopentadienyl platinum, rhodium dicarbonylacetylacetonate, strontium 2,2,6,6-tetramethylbutanedionate, tantalum methoxide, tantalum trifluoroethoxide, tellurium ethoxide, tungsten ethoxide, vanadium triisopropoxide oxide, zinc acetylacetonate, diethyl zinc and diethyl zinc.

Of these metallic compounds, the silicon compound can be preferably used as the reactive gas. The silicon compound is safe, non-explosive and highly volatile, and therefore, a stable supply of the silicon compound is possible in a plasma space, thereby ensuring homogeneous film formation.

The surface specific resistance of the tin oxide layer and zinc oxide layer composed of a tin compound and zinc compound can be reduced below $10^{11}$ $\Omega/cm^2$, and provide the functions of both a moisture proof film and a antistatic layer. Thus, the tin compound and zinc compound are preferable reactive gases.

<Reactive Gas for Forming a Transparent Conductive Film>

The reactive gas for forming a transparent conductive film used to form a transparent conductive film by atmospheric pressure plasma processing method is formed in a state of plasma in a discharge space, and contains the component for forming a transparent conductive film. An organic metallic compound such as β-diketone metallic complex, metallic alkoxide and alkyl metal is used. The reactive gas is available in two types; a reactive gas as a major component of the transparent conductive film, and a reactive gas, a small amount of which is used for doping. There is also a reactive gas used to adjust the resistance of the transparent conductive film.

The organic metallic compound having an oxygen compound in the molecule is preferably used is the reactive gas used as a major component in the formation of the transparent conductive film. Examples include: indium hexafluoropentanedionate, indium methyl(trimethyl)acetylacetonate, indium acetylacetonate, indium isopropoxide, indium trifluoropentanedionate, tris(2,2,6,6-tetramethyl-3,5-heptanedionate)indium, pentanedienylindium, di-n-butylbis(2,4-pentanedionate)tin, di-n-butyldiacetoxy tin, di-t-butyldiacetoxy tin, tetraisopropoxy tin, tetrabutoxy tin and zinc acetylacetonate. Of these examples, particularly preferred ones are: indium acetylacetonate, tris(2,2,6,6-tetramethyl 3,5-heptanedionate)indium, zinc acetylacetonate and di-n-butyldiacetoxy tin.

The reactive gas used for doping includes: aluminum isopropoxide, nickel acetylacetonate, manganese acetylacetonate, boron isopropoxide, n-butoxy antimony, tri-n-butylantimony, di-n-butylbis(2,4-pentanedionate)tin, di-n-butyldiacetoxy tin, di-t-butyldiacetoxy tin, tetraisopropoxy tin, tetrabutoxy tin, tetrabutyl tin, zinc acetylacetonate, pentafluoride propylene, hexafluoridecyclobutane and tetrafluoridecyclobutane.

The reactive gas used for adjustment of the resistance of the transparent conductive film includes titanium triisopropoxide, tetramethoxysilane, tetraethoxysilane, and hexamethyldisiloxane.

The quantitative ratio between the reactive gas used as a major component of the transparent conductive film and the reactive gas, a small amount of which is used for doping, varies according to the type of the transparent conductive film to be formed. For example, the amount of the reactive gas is adjusted so that the ratio in the numbers of atoms between In and Sn of the ITO film obtained by doping the indium oxide with tin is 100/0.1 through 100/15, preferably 100/0.5 through 100/10. The ratio in the numbers of atoms between In and Sn can be obtained from the XPS measurement.

The quantitative ratio of the reactive gas is adjusted so that the ratio in the numbers of atoms between Sn and F of the FTO film obtained by doping the tin oxide with fluorine is 100/0.01 through 100/50. The ratio in the numbers of atoms between Sn and F can be obtained from the XPS measurement.

In the $In_2O_3$—ZnO amorphous transparent conductive film (IZO film), the quantitative ratio of the reactive gas is adjusted so that the ratio in the number of atoms between In and Zn is 100/50 through 100/5. The ratio in the numbers of atoms between In and Zn can be obtained from the XPS measurement.

In the aforementioned ITO, FTO and IZO films, the amount of Sn dope, for example, is preferably 5 percent by mass or less.

To ensure uniform formation of film on the substrate film by discharge plasma processing, the content of these reactive gases in the reaction gas is preferably 0.01 through 10 percent by volume, more preferably 0.01 through 1 percent by volume.

Further, if 0.01 through 5 percent by volume of a component selected from among the oxygen, ozone, hydrogen peroxide, carbon dioxide, carbon monoxide, hydrogen and nitrogen is contained in the reactive gas, reaction will be promoted to produce a compact and high-quality thin film.

The transparent conductive film having a thickness of 0.1 nm through 1,000 nm is provided.

To introduce the aforementioned organic tin compound, organic titanium compound, organic silicon compound, organic zinc compound or organic indium compound between the electrodes forming a discharge space, the two compounds can be in any of the states of gas, liquid and solid at the normal temperature and pressure. If they are in a state of gas, they can be introduced directly into the discharge space. If they are in a state of liquid or solid, they are turned into a gas by heating, pressure reduction, ultrasonic irradiation or the like before they are used. Further, the aforementioned metallic alkoxide can be used after being diluted by a solvent. In this case, it is gasified in the rare gas by a vaporizer before it is used as a reaction gas. Such an organic solvent as an organic solvent such as methanol, ethanol isopropanol, butanol and n-hexane or the solvent formed by the mixture thereof can be used as the solvent.

<Applied Voltage>

It is preferred that, in the thin film forming method based on atmospheric pressure plasma processing, a power of 1 $W/cm^2$ or more (output density) with a high-frequency voltage exceeding 100 kHz be supplied across the electrodes arranged opposite to each other, and the reactive gas is excited so that the plasma is produced.

The upper limit of the frequency of the high-frequency voltage to be applied across the electrodes is preferably 2.5 GHz, more preferably 150 MHz. The lower limit of the frequency of the high-frequency voltage to be applied across the electrodes is preferably 200 kHz, more preferably 800 kHz. If the high-frequency voltage is smaller than 100 kHz, the film making speed will be reduced, with the result that productivity will be reduced in some cases.

The lower limit value of the power supplied across the electrodes is preferably 1 $W/cm^2$. The upper limit value is preferably 50 $W/cm^2$, still more preferably 20 $W/cm^2$. If the power is smaller than 1 $W/cm^2$, the film making speed will be reduced, with the result that productivity will be reduced in some cases. The discharge area ($1/cm^2$) denotes the area in the range wherein discharge occurs in the electrode. If a high power voltage with a high frequency and high output density is applied as in the present invention, the discharge area corresponds to the discharge area of one of the electrodes. If the total power (W) supplied from the power source connected to the aforementioned electrodes is divided by this total area, the output density can be calculated.

Further, in the atmospheric pressure plasma processing method in order to get a uniform film thickness in a large area in particular, the total power applied to a pair of opposing electrode is preferably over 15 kW, more preferably 30 kW, or more still more preferably 50 kW or more. From the viewpoint of heat generation, it is preferably 300 kW or less. The total power corresponds to the power (W) supplied from the power source connected to the aforementioned set of electrodes. When two or more power sources are connected to the aforementioned set of electrodes, it corresponds to the total of the powers supplied from all of these power sources. To put it more specifically, in the atmospheric pressure plasma processing apparatus given in FIG. 1, it corresponds to the power supplied from the power source 41 connected therewith wherein the roll rotating electrode 35 and rectangular fixed electrode group 36 are a set of opposing electrodes. To meet the requirements of the total power range, the discharge area is required to have a size over a certain value.

Further, the high-frequency voltage applied across the electrodes can be an intermittent pulse wave or continuous sine wave. To make an effective use of the advantages of the present invention, a continuous sine wave is preferred.

<Electrode>

As the electrode used for atmospheric pressure plasma processing, the plasma discharge processing apparatus is required to adopt a high-durability electrode capable of maintaining a uniform state of discharge even if such a high-power electric field is applied to the electrode having a large area under atmospheric pressure or under the pressure close to the under atmospheric pressure.

In such an electrode, at least the discharge surface of the conductive base material such as a metal is coated with a dielectric. Preferably, both the application electrode and ground electrode are coated with the dielectric.

The electrode coated with dielectric is a composite component made up of a conductive base material such as a metal, and a dielectric material such as ceramic and glass. If the power to be supplied, especially the total power, is great, fracture tends to start to occur from the brittle portion of the dielectric. This makes it difficult to ensure plasma discharge stability. Especially in the dielectric-coated electrode having a large discharge area, this disadvantage is conspicuous. To implement the thin film formation method of the present invention, at least one of the electrodes is required to be a dielectric-coated electrode capable of overcoming the aforementioned difficulties.

To put it more specifically, the dielectric used in the dielectric-coated electrode of the present invention is preferably an inorganic compound having a relative dielectric constant of 6 through 45. Such a dielectric includes a ceramic sprayed material such as alumina and silicon nitride, or a glass lined material such as silicate glass and borate glass. Of these materials, the ceramic sprayed material or glass lined material (to be described later) are preferably used. Especially the alumina-sprayed dielectric is preferred.

The preferred dielectric coated electrode capable of withstanding high power has a heat resistance temperature 100 degrees Celsius or more, preferably 120 degrees Celsius or more, more preferably 150 degrees Celsius or more. The heat resistance temperature refers to the highest temperature to be endured under normally dischargeable conditions, without dielectric breakdown. Such a heat resistance temperature can be obtained by application of the aforementioned ceramic spayed material or glass lined material of laminated structure, or by adequate combination of the means for adequate selection of the material within the range of the difference in linear thermal expansion coefficients between the following conductive base material and dielectric.

In the dielectric coated electrode used in the present invention, another preferred example is such a combination that the difference in linear thermal expansion coefficient between the dielectric and conductive base material is $10 \times 10^{-6}$/degrees Celsius or less, preferably $8 \times 10^{-6}$/degrees or less, more preferably $5 \times 10^{-6}$/degrees or less, still more preferably $2 \times 10^{-6}$/degrees or less. The linear thermal expansion coefficient is defined as a physical property specified to a known material.

A preferred combination of the conductive base material and dielectric wherein the difference in linear thermal expansion coefficient is within this range is such a combination that the conductive base material is a titanium metal or titanium alloy containing 70 percent by mass or more of titanium, and the dielectric is a ceramic-sprayed film or a glass lined film.

The aforementioned titanium metal or alloy can be used without problem, if it contains not less than 70 percent by mass of titanium. It is preferred to contain 80 percent by mass of titanium. The titanium metal or alloy applicable to the present invention includes the one commonly used as pure titanium for industrial use, corrosion proof titanium and high strength titanium. The pure titanium for industrial use includes TIA, TIB, TIC and TID. They each contain a very small amount of iron atom, carbon atom, nitrogen atom, oxygen atom, and hydrogen atom, and contain not less than 99 percent by mass of titanium. The T15PB is preferably used as the corrosion proof titanium alloy. In addition to the aforementioned atoms, it contains lead. The titanium content is not less than 98 percent by mass. Further, the T64, T325, T525 and TA3 containing aluminum, vanadium and tin in addition to the aforementioned atoms except for the lead in addition to the aforementioned atoms except for the lead is preferably used as a titanium alloy. The titanium content of some of them is not less than 85 percent by mass. These titanium alloy or metal has a thermal expansion coefficient of about ½ smaller than that of the stainless steel, for example, AISI316. A combination with the dielectric (to be described later) provided on the titanium alloy or metal is preferred as a metallic base material, because it allows a long-time use at a high temperature.

Another requirement of the dielectric coated electrode of the present invention capable of withstanding high power is that the dielectric has a thickness of 0.5 through 2 mm. The variation in the film thickness is preferably 5 percent or less, more preferably 3 percent or less, still more preferably 1 percent or less.

To further reduce the void ratio of the dielectric, the ceramic sprayed film or the like is preferably provided with pore sealing, using an inorganic compound. The inorganic compound is preferred to be a metal oxide. The metal oxide containing the silicon oxide ($SiO_2$) as a major component is preferred in particular.

The inorganic compound provided with pore sealing treatment is preferably cured and formed by sol-gel reaction. If the inorganic compound provided with pore sealing treatment is mainly composed of the metal oxide, the metallic alkoxide as the pore sealing solution is coated on the ceramic sprayed film, and is cured by sol-gel reaction. If the inorganic compound is mainly composed of silica, alkoxysilane is preferably used as the pore sealing solution.

To promote the so-gel reaction, use of energy processing is preferred. The method of energy processing includes heat curing (preferably at 200 degrees Celsius or less) and ultraviolet irradiation. In the step of pore sealing, the pore sealing solution is diluted, and coating and curing operations are repeated several times in sequence. This will further improve the purity of the inorganic content, and will produce a compact electrode free of deterioration.

In the case of pore sealing treatment wherein the metallic alkoxide or the like of the dielectric coated electrode as a pore sealing solution is coated on the ceramic sprayed film, and curing is carried out by so-gel reaction, the content of the metal oxide having been cured is preferably 60 mol percent or more. When alkoxysilane is used as the metallic alkoxide of the pore sealing solution, the content of the $SiO_x$ having been cured (x denotes 2 or less) is preferably 60 mol percent or more. The content of $SiO_x$ having been cured can be measured by analyzing the cross section of the dielectric layer by XPS.

The surface roughness Rmax (JIS B 0601) of the electrode can be kept at 10 μm or less by grind-finishing the surface of the dielectric of the dielectric coated electrode. This procedure ensures a constant thickness of the dielectric and a constant gap between electrodes, and improves the stability of discharging. Further, this procedure eliminates the difference in thermal shrinkage, and the strain and crack resulting from residual stress, and ensures higher precision and much improved durability. Grind-finishing if the surface of the dielectric is preferably applied to the dielectric on the side in contact with the substrate film.

<Activated Light Curable Resin>

A metallic compound such as the moisture proof film and transparent conductive film can be directly formed on the aforementioned transparent film for display substrate of the present invention. Alternatively, the metallic compound can be formed on at least one other intermediate layer provided on the aforementioned transparent film. An antiglare layer or clear hard core is preferably used as such a layer to be provided. The moisture proof film and transparent conductive film of the present invention are formed on the resin layer cured by ultraviolet rays, whereby a transparent conductive film characterized by excellent resistance to a scratch is obtained.

When the metal oxide is formed by atmospheric pressure plasma processing, this intermediate layer improves bondability and reduces plasma damages. Thus, the intermediate layer improves the characteristics of the metallic compound layer, as compared to the case where metallic compound is formed directly on the transparent film of the present invention. The intermediate layer improves the degree of adhesion between the transparent film of the present invention and the metallic compound.

The activated light cured resin layer such as an antiglare layer and a clear hard core is a resin layer formed by polymerization of the component including the polymerizable unsaturated monomer. The activated light cured resin layer is defined as a layer mainly composed of the resin cured through cross-linking reaction and others by irradiation of the activated light such as an ultraviolet ray and electron beam. The activated light cured resin layer is typically represented by the ultraviolet cured ink and electron beam cured resin. It is also possible to use the resin that is cured by the light other than ultraviolet cured ink and electron beam. The ultraviolet cured resin includes ultraviolet cured type acryl urethane resin, ultraviolet cured type polyester acrylate resin, ultraviolet cured type epoxy acrylate resin, ultraviolet cured type polyol acrylate resin and ultraviolet cured type epoxy resin.

<Layer Composition>

In the display substrate wherein a moisture proof film or transparent conductive film having a small thickness is formed on the transparent film for display substrate, these layers can be laminated one on top of another. Alternatively, they can be formed on each surface of the substrate. Alternatively, the moisture proof film can be formed on both surfaces.

When the moisture proof film and transparent conductive film are laminated, for example, two plasma discharge processing apparatus are arranged in a reaction gas atmosphere under atmospheric pressure or under the pressure close to the under atmospheric pressure. They are arranged in series in the order of moisture proof film and conductive film so that two layers are laminated; then continuous processing can be performed, as shown in FIG. 1. This method of continuous lamination ensures stable quality, reduced cost and improved productivity, and therefore, is suited for the production of the conductive film of the present invention. Needless to say, instead of simultaneous lamination, sequential processing is also possible, wherein, the processed layer is wound after processing of each layer.

A stain-proofing layer may be provided on the back of the transparent film for display substrate without the conductive layer laminated thereon. If the back surface is also provided with a moisture proof film, a stain-proofing layer and an antireflection film can be laminated on the moisture proof film. The transparent film or transparent conductive film of the present invention may be laminated on another film-, sheet- or plate-shaped mold.

To ensure that the visibility of a transmitted image will not be interrupted by a stain deposited on the transparent substrate surface, the stain-proofing layer is provided to prevent a stain or fingerprint from being deposited, and to allow easy removal of the stain by wiping. To form a stain-proofing layer, for example, isopropyl alcohol is added to a thermal cross-linked fluorine-containing polymer, and 0.2 percent by mass of coarsely dispersed solution is prepared. This is coated on the surface of the extreme surface layer by a bar coater, whereby the stain-proofing layer is formed.

The following describes an example of the preferred structure of a display substrate of the present invention:

(A) Transparent film for display substrate of the present invention (substrate), intermediate layer, moisture proof layer and transparent conductive film (B) Stain-proofing layer, transparent film for display substrate of the present invention (substrate), intermediate layer, moisture proof layer and transparent conductive film.

(C) Moisture proof layer, intermediate layer, transparent film for display substrate of the present invention (substrate), intermediate layer and transparent conductive film (D) Stain-proofing layer, moisture proof layer, intermediate layer, transparent film for display substrate of the present invention (substrate), and transparent conductive film <Waveform Dispersion Characteristic of Transparent Birefringence>

In the transparent film for display substrate wherein moisture proof film or transparent conductive film are formed, the overall light transmittance of the film is preferably 50% or more. In the film generally used for optical application, the overall light transmittance of the film is preferably 80% or more, more preferably 90% or more. The overall light transmittance can be defined as the percentage of the overall light transmittance relative to the parallel incoming luminous flux of a test piece (See JIS K-7361-1).

In the transparent film for display substrate wherein a moisture proof film or transparent conductive film is formed, the waveform dispersion characteristic of birefringence as viewed from the normal line is preferably positive. The polarization can be corrected in the full wavelength area of visible light by using a film having a positive waveform dispersion characteristic of birefringence as the display substrate. In the liquid crystal panel using the display method based on the birefringence, color misregistration is prevented. In the organic electroluminescence display device, excellent contract is provided.

Various types of functional thin films can be laminated on the transparent conductive film, using the transparent conductive film as a thin film transparent electrode and patterning it if required, whereby such an electric device as the aforementioned liquid crystal display, organic electroluminescence display or touch panel is provided.

Embodiment

The following provides a specific description of the present invention with reference to embodiments, without the prevent invention being restricted thereto.

Embodiment 1

<Example of Synthesis 1>

Synthesis was carried out by reference to the synthesis method disclosed in the J. Appl. Polym. Sci., vol. 58, 1263-1274(1995).

100 parts by mass of diacetyl cellulose (hereinafter referred to as "DAC") was dissolved in 700 parts by mass of dehydrated tetrahydrofuran (hereinafter referred to as "THF"). After that, 10 parts by mass of 3-isocyanatepropylethoxysilane (hereinafter referred to as "IPTES") was dropped, and 0.8 parts by mass of dibutyl tin dilaurate was dropped as a catalyst. This was stirred under heating and reflex for five hours.

Five hours later, the infrared absorption spectrum of the solution was measured. It was revealed that the absorption of 2271 $cm^{-1}$ derived from the isocyanate group of the IPTES had been disappeared. Accordingly, heating was suspended and the solution was left to cool down. It was poured into 3 L of methanol to be settled again, whereby a white solid was obtained at a yield of 99.6%. The $Si^{29-}$NMR spectrum of the white solid having been obtained was measured, and a single absorption was observed at −45.25 ppm. Further, the $C^{13}$—NMR spectrum was measured and the absorption of amidocarbonyl was observed at 163.07 ppm. This has proven that the cellulose ester 1 as a target substance was obtained.

The degree of substitution of the cellulose ester 1 having been obtained was measured according to the ASTM D817-96. The following was obtained: Acetyl group=2.33 and triethoxysilylpropylamidocarbonyl group=0.10.

<How to Produce the Substrate Film 101 of the Present Invention>

60 parts by mass of ethanol, 685 parts by mass of methylene chloride and 100 parts by mass of DAC were put in a mixing tank. They were dissolved by being heated and stirred at 80 degrees Celsius to yield dope A.

When molecular weight was measured under the aforementioned conditions, the number average molecular weight of DAC was 120,000 and the number average molecular weight was 300,000.

This dope was cast using a band caster, and was separated from off the band. Immediately thereafter, it was fed to the tenter, where it was drawn 10% in the TD direction and 10% in the MD direction. After that, it was dried at 120 degrees Celsius to get the substrate film 101 of the present invention. Coating was made in such a way as to ensure that the film thickness would be 100 µm in the final stage. The following describes specific conditions for drawing in the longitudinal and lateral directions:

Lateral Drawing

After the film was preheated at 80 degrees Celsius for 10 seconds, it was drawn with such a temperature gradient as to ensure that the temperature would be 130 degrees Celsius at the termination of drawing operation. The drawing speed was 100%/minute. A tenter rail was expanded at the drawing startup portion so that a curvature radius would be 100 mm at the time of transition from preheating to drawing. After drawing, the film was loosened 5 percent at 130 degrees Celsius for 30 seconds. Drawing operation was conducted so that a predetermined magnification would be reached under this condition.

After that, both ends of the film having been gripped by a chuck were slit.

Longitudinal Drawing

After the film was preheated at 90 degrees Celsius for 10 seconds, it was passed between the rolls, having been heated up to 90 degrees Celsius, immediately before drawing. The film was drawn while being heated by an infrared heater split in three pieces across the width, so that the temperature at the center of the film would be 130 degrees Celsius and the temperature at both ends would be 145 degrees Celsius. Settings were determined to ensure that the value obtained by dividing the drawing roll spacing by the base width would be five times. The drawing speed was at 300%/minute. After that, the film was allowed to pass through the four cooling rolls where the roll temperature differences were each set at 30 degrees Celsius lower with reference to the drawing temperature, and was cooled gradually. During this time, the film tension was loosened 3% in the longitudinal direction. Drawing operation was conducted so that a predetermined magnification would be reached under this condition.

The amount of residual solvent was calculated according to the following formula:

Amount of residual solvent (percent by mass)=$(M-N)/N \times 100$ where M denotes the mass of the film immediately after separation, and N indicates the mass of the separated film immediately after having been dried at 120 degrees Celsius for 30 minutes.

Substrate films mentioned below were prepared by changing the drawing magnification under a drawing condition similar to the above, as long as there is no notice especially.

<How to Produce the Substrate Film 102 of the Present Invention>

The dope A was cast using a band caster. When the amount of residual solvent had reached 60%, it was separated from the band and was fed to the tenter immediately, where it was drawn 20% in the TD direction and then 20% in the MD direction. After that, it was dried at 120 degrees Celsius to get the substrate film 102 of the present invention. Casting was made in such a way as to ensure that the film thickness would be 100 µm in the final stage.

<How to Produce the Substrate Film 103 of the Present Invention>

The dope A was cast using a band caster. When the amount of residual solvent had reached 70%, it was separated from the band and was fed to the tenter immediately, where it was drawn 30% in the TD direction and then 30% in the MD direction. After that, it was dried at 120 degrees Celsius to get the substrate film 103 of the present invention. Casting was made in such a way as to ensure that the film thickness would be 100 µm in the final stage.

<How to Produce the Substrate Film 104 of the Present Invention>

The dope A was made to contain 0.1 percent by mass of EPEG (ethylphthalylethylglycolate) as a plasticizer. The resulting dope was cast using a band caster. When the amount of residual solvent had reached 70%, it was separated from the band and was fed to the tenter immediately, where it was drawn 30% in the TD direction and then 30% in the MD direction. After that, it was dried at 120 degrees Celsius to get the substrate film 104 of the present invention. Casting was made in such a way as to ensure that the film thickness would be 100 µm in the final stage.

<How to Produce the Substrate Film 105 of the Present Invention>

The dope A was made to contain 0.5 percent by mass of EPEG (ethylphthalylethylglycolate) as a plasticizer. The resulting dope was cast using a band caster. When the amount of residual solvent had reached 70%, it was separated from the band and was fed to the tenter immediately, where it was drawn 30% in the TD direction and then 30% in the MD direction. After that, it was dried at 120 degrees Celsius to get the substrate film 105 of the present invention. Coating was made in such a way as to ensure that the film thickness would be 100 μm in the final stage.

<How to Produce the Substrate Film 106 for Comparison>

The dope A was made to contain 1.0 percent by mass of EPEG (ethylphthalylethylglycolate) as a plasticizer. The resulting dope was cast using a band caster. When the amount of residual solvent had reached 70%, it was separated from the band and was fed to the tenter immediately, where it was drawn 30% in the TD direction and then 30% in the MD direction. After that, it was dried at 120 degrees Celsius to get the substrate film 106 of the present invention. Coating was made in such a way as to ensure that the film thickness would be 100 μm in the final stage.

<How to Produce the Substrate Film 107 of the Present Invention>

60 parts by mass of ethanol, 685 parts by mass of methylene chloride and 100 parts by mass of triacetyl cellulose (hereinafter referred to as "TAC") were put in a mixing tank. They were dissolved while being heated and stirred at 80 degrees Celsius to yield dope B.

This dope was cast using a band caster. When the amount of residual solvent had reached 50%, it was separated from the band and was fed to the tenter immediately, where it was drawn 10% in the TD direction and then 10% in the MD direction. After that, it was dried at 120 degrees Celsius to get the substrate film 107 of the present invention. Casting was made in such a way as to ensure that the film thickness would be 100 μm in the final stage.

<How to Produce the Substrate Film 108 of the Present Invention>

The dope B was cast using a band caster. When the amount of residual solvent had reached 60%, it was separated from the band and was fed to the tenter immediately, where it was drawn 20% in the TD direction and then 20% in the MD direction. After that, it was dried at 120 degrees Celsius to get the substrate film 108 of the present invention. Casting was made in such a way as to ensure that the film thickness would be 100 μm in the final stage.

<How to Produce the Substrate Film 109 of the Present Invention>

The dope A was cast using a band caster. When the amount of residual solvent had reached 70%, it was separated from the band and was fed to the tenter immediately, where it was drawn 30% in the TD direction and then 30% in the MD direction. After that, it was dried at 120 degrees Celsius to get the substrate film 109 of the present invention. Casting was made in such a way as to ensure that the film thickness would be 100 μm in the final stage.

<How to Produce the Substrate Film 110 of the Present Invention>

Dope A was prepared in advance and was put in the mixing tank.

25.2 parts by mass of tetramethoxysilane, 12.6 parts by mass of ethanol, 12.6 parts by mass of methylene chloride and 12 parts by mass of 0.5% aqueous solution of nitric acid were put in that order in another mixing tank. They were stirred at 120 degrees Celsius for one hour to yield dope C.

This dope C was mixed with dope A, and was stirred for one hour to yield dope D. The amount used for mixing was such that the mass ratio between the DAC and $SiO_2$ in the dope A would be 91 to 9, assuming that all the added tetramethoxysilane had changed into $SiO_2$. The resulting dope D was cast using a band caster. When the amount of residual solvent had reached 50%, it was separated from the band and was fed to the tenter immediately, where it was drawn 10% in the TD direction and then 10% in the MD direction. After that, it was dried at 120 degrees Celsius to get the substrate film 110 of the present invention. Casting was made in such a way as to ensure that the film thickness would be 100 μm in the final stage.

<How to Produce the Substrate Film 111 of the Present Invention>

The dope D was cast using a band caster. When the amount of residual solvent had reached 60%, it was separated from the band and was fed to the tenter immediately, where it was drawn 20% in the TD direction and then 20% in the MD direction. After that, it was dried at 120 degrees Celsius to get the substrate film 111 of the present invention. Casting was made in such a way as to ensure that the film thickness would be 100 μm in the final stage.

<How to Produce the Substrate Film 112 of the Present Invention>

60 parts by mass of ethanol, 685 parts by mass of methylene chloride and 100 parts by mass of the cellulose ester 1 yielded in the synthesis example 1 were put in a mixing tank. They were dissolved by being heated and stirred at 120 degrees Celsius to yield dope E.

In the similar manner, dope C was prepared in advance and was put in another mixing tank. This dope E was mixed with dope C, and was stirred for one hour to yield dope F.

The dope F was cast using a band caster. When the amount of residual solvent had reached 50%, it was separated from the band and was fed to the tenter immediately, where it was drawn 10% in the TD direction and then 10% in the MD direction. After that, it was dried at 120 degrees Celsius to get the substrate film 112 of the present invention. Casting was made in such a way as to ensure that the film thickness would be 100 μm in the final stage.

<How to Produce the Substrate Film 113 of the Present Invention>

The dope F was cast using a band caster. When the amount of residual solvent had reached 60%, it was separated from the band and was fed to the tenter immediately, where it was drawn 20% in the TD direction and then 20% in the MD direction. After that, it was dried at 120 degrees Celsius to get the substrate film 113 of the present invention. Casting was made in such a way as to ensure that the film thickness would be 100 μm in the final stage.

<How to Produce the Substrate Film 114 of the Present Invention>

60 parts by mass of ethanol, 685 parts by mass of methylene chloride, 0 parts by mass of Coronate L (by Nippon Polyurethane Co., Ltd.) and 10 parts by mass of DAC were put in a mixing tank. They were dissolved by being heated and stirred at 40 degrees Celsius to yield dope G.

This dope was cast using a band caster. When the amount of residual solvent had reached 50%, it was separated from the band and was fed to the tenter immediately, where it was drawn 10% in the TD direction and then 10% in the MD direction. After that, it was dried at 150 degrees Celsius to get the substrate film 114 of the present invention. Casting was made in such a way as to ensure that the film thickness would be 100 μm in the final stage.

<How to Produce the Substrate Film 115 of the Present Invention>

The dope G was cast using a band caster. When the amount of residual solvent had reached 60%, it was separated from the band and was fed to the tenter immediately, where it was drawn 20% in the TD direction and then 20% in the MD direction. After that, it was dried at 150 degrees Celsius to get the substrate film 115 of the present invention. Casting was made in such a way as to ensure that the film thickness would be 100 μm in the final stage.

<How to Produce the Substrate Film 116 of the Present Invention>

60 parts by mass of ethanol, 685 parts by mass of methylene chloride, 30 parts, by mass of dipentaerithritol pentaacrylate (compound example 35), 30 parts by mass of 1-hydroxycyclohexylphenylketone and 100 parts by mass of DAC were put in a mixing tank. They were dissolved by being heated and stirred at 80 degrees Celsius to yield dope H.

This dope was cast using a band caster. When the amount of residual solvent had reached 50%, it was separated from the band and was fed to the tenter immediately, where it was drawn 20% in the TD direction and then 20% in the MD direction. After that, when the amount of residual solvent had reached the level of 3% or less, ultraviolet rays of 200 mW/cm$^2$ were applied to both surfaces of the film for ten seconds each, using a metal halide lamp. It was dried at 120 degrees Celsius to get the substrate film 116 of the present invention. Casting was made in such a way as to ensure that the film thickness would be 100 μm in the final stage.

<How to Produce the Substrate Film 117 of the Present Invention>

The dope H was cast using a band caster. When the amount of residual solvent had reached 50%, it was separated from the band and was fed to the tenter immediately, where it was drawn 30% in the TD direction and then 30% in the MD direction. After that, when the amount of residual solvent had reached the level of 3% or less, ultraviolet rays of 200 mW/cm$^2$ were applied to both surfaces of the film for ten seconds each, using a metal halide lamp. It was dried at 120 degrees Celsius to get the film 117 of the present invention. Casting was made in such a way as to ensure that the film thickness would be 100 μm in the final stage.

<How to Produce the Substrate Film 118 of the Present Invention>

The dope H was cast using a band caster. When the amount of residual solvent had reached 70%, it was separated from the band and was fed to the tenter immediately, where it was drawn 50% in the TD direction and then 50% in the MD direction. After that, when the amount of residual solvent had reached the level of 3% or less, ultraviolet rays of 200 mW/cm$^2$ were applied to both surfaces of the film for ten seconds each, using a metal halide lamp. It was dried at 120 degrees Celsius to get the film 118 of the present invention. Casting was made in such a way as to ensure that the film thickness would be 100 μm in the final stage.

<How to Produce the Substrate Film 119 of the Present Invention>

The same dope A as that used in producing the substrate film 101 was prepared. This dope was cast using a band caster. When the amount of residual solvent had reached 50%, it was separated from the band, and was dried at 120 degrees Celsius without being drawn, whereby the film 119 of the present invention was produced. Casting was made in such a way as to ensure that the film thickness would be 100 μm in the final stage.

<How to Produce the Substrate Film 120 of Comparative Example>

The same dope B as that used in producing the substrate film 107 was prepared. This dope was cast using a band caster. When the amount of residual solvent had reached 50%, it was separated from the band, and was dried at 120 degrees Celsius without being drawn, whereby the film 120 of the present invention was produced. Casting was made in such a way as to ensure that the film thickness would be 100 μm in the final stage.

<Substrate Film 121 of Comparative Example>

The "SUMILITE FS-1300" by Sumitomo Bakelite as a polyether sulfone film having a thickness of 100 μm was used as a substrate film 121 for comparison.

<Substrate Film 122 of Comparative Example>

The "Pure Ace" by Teijin Limited as polycarbonate film having a thickness of 100 μm was used as a substrate film 122 for comparison.

<Substrate Film 123 of Comparative Example>

The "Artone" by JSR as a polynorbornene film having a thickness of 100 μm was used as a substrate film 123 for comparison.

The substrate films 101 through 118 produced in the aforementioned procedure and the substrate films 119 through 123 as comparative examples were evaluated according to the following criteria. The results of evaluation are given in Table 1.

<<Measurement of Glass-Transition Temperature and Linear Expansion Coefficient>>

The glass-transition temperature of the cellulose esters of the present invention cannot be measured accurately by a differential scanning calorimeter (DSC) in many cases. Accordingly, the point of inflection of the temperature strain curve in the thermal mechanical analysis (TMA) was assumed as the glass-transition temperature.

The TMA-SS6100 by Seiko Instrument was used to measure the thermal stress and strain. A sample with a film thickness of 100 μm and a width of 4 mm was clamped at a chuck distance of 20 mm, and The temperature was raised from room temperature up to 180 degrees Celsius to remove residual the strain. Then it was raised from room temperature to 250 degrees Celsius at 5 degrees Celsius per minute. The linear expansion coefficient calculated from the elongation of the chuck distance. The linear expansion coefficient in the Table has only one value. Almost the same linear expansion coefficient was obtained in both the MD and TD directions.

As described above, the glass-transition temperature was calculated from the point of inflection of the temperature/strain curve.

<<Waveform Dispersion Characteristic of Birefringence>>

The automatic birefringence meter KOBRA-21ADH by Oji Keisokukiki Co., Ltd. was used to measure the waveform dispersion characteristic of birefringence. The birefringence (nm) refers to the value obtained by multiplying the difference in refractive indexes of the inner surface of each substrate film in the X and Y directions by 50 μm as an assumed thickness.

In the similar manner, the retardation value $R_0$ (480) and at 480 nm and retardation value $R_0$ (590) and at 590 nm were measured using the KOBRA-21ADH. The ratio between the birefringence value at 480 nm and that at 560 nm was calculated as shown in the following formula to evaluate the waveform dispersion of the birefringence.

$$P = R_0(480)/R_0(590)$$

<Measurement of Full-Light Transmittance>>

The Turbidity Meter T-2600DA by Tokyo Denshoku Co., Ltd. was used to measure the full-light transmittance.

TABLE 1

| *1 | Cellulose ester | Additive | *2 | *3 | *4 | Tg (° C.) | *5 | P | Remarks |
|---|---|---|---|---|---|---|---|---|---|
| 101 | DAC(100%) | — | 10 | 93.3 | 2.2 | 203 | 49 | 0.97 | Inv. |
| 102 | DAC(100%) | — | 20 | 93.3 | 3.3 | 203 | 36 | 0.97 | Inv. |
| 103 | DAC(100%) | — | 30 | 93.3 | 4.8 | 203 | 27 | 0.97 | Inv. |
| 104 | DAC(100%) | EPEG(0.1%) | 30 | 92.4 | 4.8 | 200 | 30 | 0.97 | Inv. |
| 105 | DAC(100%) | EPEG(0.5%) | 30 | 92.4 | 4.8 | 195 | 35 | 0.97 | Inv. |
| 106 | DAC(100%) | EPEG(1.0%) | 30 | 92.4 | 4.8 | 178 | 61 | 0.97 | Comp. |
| 107 | TAC(100%) | — | 10 | 93.3 | 1.2 | 193 | 47 | 0.98 | Inv. |
| 108 | TAC(100%) | — | 20 | 93.3 | 2.5 | 193 | 34 | 0.98 | Inv. |
| 109 | TAC(100%) | — | 30 | 92.2 | 3.2 | 193 | 25 | 0.98 | Inv. |
| 110 | DAC(91%) | SiO$_2$(9%) | 10 | 92.2 | 3.2 | 225 | 49 | 0.98 | Inv. |
| 111 | DAC(91%) | SiO$_2$(9%) | 20 | 92.2 | 4.2 | 225 | 36 | 0.98 | Inv. |
| 112 | Cellulose ester 1(91%) | SiO$_2$(9%) | 10 | 92.2 | 3.2 | 217 | 50 | 0.99 | Inv. |
| 113 | Cellulose ester 1(91%) | SiO$_2$(9%) | 20 | 92.2 | 3.2 | 217 | 42 | 0.99 | Inv. |
| 114 | DAC(91%) | CORONATE L(9%) | 10 | 92.2 | 3.2 | 206 | 46 | 0.98 | Inv. |
| 115 | DAC(91%) | CORONATE L(9%) | 20 | 92.2 | 3.2 | 206 | 38 | 0.98 | Inv. |
| 116 | DAC(77%) | Compound example 35(23%) | 20 | 92.2 | 1.7 | 235 | 48 | 0.98 | Inv. |
| 117 | DAC(77%) | Compound example 35(23%) | 30 | 92.2 | 3.8 | 235 | 34 | 0.98 | Inv. |
| 118 | DAC(77%) | Compound example 35(23%) | 50 | 92.2 | 7.1 | 235 | 18 | 0.98 | Inv. |
| 119 | DAC(100%) | — | 0 | 93.3 | 1.3 | 203 | 66 | 0.97 | Comp. |
| 120 | TAC(100%) | — | 0 | 93.3 | 0.2 | 203 | 55 | 0.98 | Comp. |
| 121 | SUMILITE FS-1300 | — | 0 | 90.6 | 8.3 | 223 | 82 | 1.14 | Comp. |
| 122 | PURE ACE | — | 0 | 91.0 | 131 | 152 | 86 | 1.09 | Comp. |
| 123 | ARTONE | — | 0 | 92.2 | 8.0 | 171 | 102 | 1.01 | Comp. |

*1: Substrate film No.,
*2: Drawing magnification (%),
*3: Full light transmittance (%),
*4: Birefringence (Inner surface) (nm),
*5: Linear expansion coefficient (ppm/° C.)
Inv.: Invention,
Comp.: Comparative example
Compound example 35: dipenta-erithritol pentaacrylate
EPEG; ethyl phthalyl ethyl glycolate (plasticizer)

The substrate films 122 and 123 of the comparative examples had a low glass-transition temperature and a high linear expansion coefficient, and therefore, they are preferably used. The substrate film 121 has a high glass-transition temperature and high linear expansion coefficient; this was not preferable. The substrate films 119 and 120 of the comparative examples had a high glass-transition temperature and a high linear expansion coefficient; this was not preferable.

By contrast, although the composition was the same as that of the film 119 of the comparative example, the substrate film 101 of the present invention having been subjected to the step of drawing maintained a high glass-transition temperature and a small linear expansion coefficient, and therefore, was a preferable film. Further, the substrate films 110 and 111 with the increased draw magnification had a lower linear expansion coefficient and were preferable.

The substrate films 110 and 111 composed of the DAC hybridized with silica had the same linear expansion coefficient as that of the film without silica used for hybridization, but there was a substantial improvement of the Tg, and therefore, the substrate films 110 and 111 were preferable. Further, the hybrid films 112 and 113 hybridized with the cellulose ester having a site for silane coupling thereon had a high Tg and low linear expansion coefficient, and therefore, were preferable.

The films 114 and 115 cross-linked with DAC using the cross-linking agent had a high Tg and a low linear expansion coefficient, and therefore, were preferable.

The substrate films 116 through 118 having a semi-IPN structure composed of the DAC and cross-linked acrylate polymer had high Tg and a low linear expansion coefficient, and therefore, were preferable.

Embodiment 2

Transparent conductive films 201 through 223 were prepared by forming thin films on the substrate films 101 through 123 obtained in the first embodiment in the order of the clear hard coated layer (on both surfaces), moisture proof film (on both surfaces) and transparent conductive film (on one surface).

<Formation of a Clear Hard Coated Layer>

The substrate film 101 was coated using an extrusion coater so that the composition of the coating of the following hard coated layer would have a film thickness of 3 μm. After that, it was dried for one minute by the drier with its temperature set at 80 degrees Celsius, and was then exposed to ultraviolet irradiation of 120 mW/cm$^2$, whereby the clear hard coated layer was formed.

(Coating composition of clear hard coated layer)

| | |
|---|---|
| Dipenta-erithritol hexaacrylate monomer: | 60 parts by mass |
| Dipenta-erithritol hexaacrylate dimmer: | 20 parts by mass |
| Dipenta-erithritol hexaacrylate trimer: | 20 parts by mass |

-continued

| (Coating composition of clear hard coated layer) | |
|---|---|
| Dimethoxybenzophenone: | 4 parts by mass |
| Ethyl acetate: | 50 parts by mass |
| Methylethyl ketone: | 50 parts by mass |
| Isopropyl alcohol: | 50 parts by mass |

<Formation of a Moisture Proof Film>

The plasma discharge apparatus equipped with parallel flat type electrodes was used. The aforementioned substrate film was placed between these electrodes, and a gas mixture was introduced therein, whereby a thin film was formed.

The following electrode was used: An alumina sprayed film of high density and high degree of adhesion was coated on a stainless steel plate having dimensions of 200 mm×200 mm×2 mm. Then a solvent made of tetramethoxysilane diluted with ethyl acetate was coated and dried. After that, it was exposed to ultraviolet irradiation and was cured. It was provided with pore sealing treatment. Further, the surface of the dielectric coated in the aforementioned manner was made flat by grinding and was processed so as to yield a Rmax of 5 μm. The electrode was formed in this manner and was grounded.

To produce an application electrode, a plurality of hollow rectangular titanium pipes coated with the aforementioned dielectric under the same conditions were produced, whereby opposing electrode groups were manufactured.

To provide power for plasma generation, the high-frequency power source JRF-10000 by Nippon Denshi Co., Ltd. was used to supply the electricity of the voltage having a frequency of 13.56 MHz and power of 5 W/cm$^2$, and a gas mixture of the following composition was introduced between electrodes:

| Inert gas: Argon: | 99.3 percent by volume |
|---|---|
| Reactive gas 1: Hydrogen: | 0.5 percent by volume |
| Reactive gas 2: Tetraethoxysilane: | 0.3 percent by volume |

Atmospheric plasma processing was carried out using the aforementioned reactive gas under the aforementioned reaction conditions, and a silicon oxide film having a film thickness of 180 nm was formed as a moisture proof film on the clear hard coated layer of the substrate films 101 through 123 equipped with the clear hard coated layer.

<Formation of a Transparent Conductive Film>

A transparent conductive film was formed using the gas mixture having the following composition, under the same atmospheric plasma conditions as those for formation of the moisture proof film except that the supply power was changed to 12 W/cm$^2$:

| Inert gas: Helium: | 98.69 percent by volume |
|---|---|
| Reactive gas 1: Hydrogen: | 0.05 percent by volume |
| Reactive gas 2: Indium acetylacetonate: | 1.2 percent by volume |
| Reactive gas 3: Dibutyl tin diacetate: | 0.05 percent by volume |
| Reactive gas 4: Tetraethoxysilane: | 0.01 percent by volume |

Atmospheric plasma processing was carried out using the aforementioned reactive gas under the aforementioned reaction conditions, and a tin-doped indium oxide film (ITO film) (having a thickness of 110 nm) was formed as a transparent conductive film on the silicon oxide layer of the substrate films 101 through 123 equipped with the clear hard coated layer and silicon oxide layer, whereby transparent conductive films 201 through 223 were obtained.

The transparent conductive films 201 through 223 produced in the aforementioned manner were evaluated as follows:

<<Transmittance>>

The Turbidity Meter T-2600DA by Tokyo Denshoku Co., Ltd. was used to measure the transmittance.

<<Evaluation of Moisture Permeability>>

Moisture permeability was measured according to the conditions specified in JIS-Z-0208 (at 40 degrees Celsius with 90% RH). Further, a series of cooling and heating cycle (thermal shock cycle) was conducted ten times, wherein a sample was heated at 180 degrees Celsius for one hour and was then left to cool at room temperature for one hour. After that, moisture permeability was measured.

<<Specific Resistance>>

Specific resistance was obtained by the four-terminal technique according to the JIS-R-1637. The Lorester GP and MCP-T600 by Mitsubishi Chemical Co., Ltd. were used for measurement.

The specific resistance, transmittance and moisture permeability of the transparent conductive films 201 through 223 were evaluated. The results of evaluation are given in Table 2.

TABLE 2

| Transparent conductive film | Transmittance (%) | *1 | *2 | Specific resistance (×10$^{-4}$ Ω cm) | Remarks |
|---|---|---|---|---|---|
| 201 | 87 | 0.47 | 1.00 | 2.3 | Invention |
| 202 | 88 | 0.48 | 0.88 | 2.3 | Invention |
| 203 | 88 | 0.48 | 0.71 | 2.2 | Invention |
| 204 | 88 | 0.48 | 0.79 | 2.2 | Invention |
| 205 | 88 | 0.48 | 0.97 | 2.3 | Invention |
| 206 | 88 | 0.45 | * | 2.8 | Comparative example |
| 207 | 88 | 0.43 | 0.93 | 2.7 | Invention |
| 208 | 88 | 0.43 | 0.83 | 2.7 | Invention |
| 209 | 88 | 0.43 | 0.81 | 2.8 | Invention |
| 210 | 88 | 0.51 | 0.91 | 1.7 | Invention |
| 211 | 88 | 0.52 | 0.83 | 1.7 | Invention |
| 212 | 88 | 0.49 | 0.97 | 1.8 | Invention |
| 213 | 88 | 0.49 | 0.88 | 1.8 | Invention |
| 214 | 88 | 0.41 | 0.95 | 1.9 | Invention |
| 215 | 88 | 0.41 | 0.89 | 1.9 | Invention |
| 216 | 88 | 0.34 | 0.96 | 1.7 | Invention |
| 217 | 88 | 0.33 | 0.83 | 1.7 | Invention |
| 218 | 88 | 0.33 | 0.69 | 1.7 | Invention |
| 219 | 88 | 0.48 | 2.48 | 2.3 | Comparative example |
| 220 | 88 | 0.43 | 1.43 | 2.7 | Comparative example |
| 221 | 85 | 0.33 | 6.4 | 1.9 | Comparative example |
| 222 | 85 | 0.3 | * | 2.6 | Comparative example |
| 223 | 87 | 0.31 | * | 2.5 | Comparative example |

*1: Moisture permeability (immediate) (g/m$^2$/d)
*2: Moisture permeability (after thermal shock cycle) (g/m$^2$/d)
* Softening and deformation occurred to the films 206, 222 and 223 during thermal shock cycle and moisture permeability was unsuccessful.

Table 2 indicates that the moisture permeability of the substrate film in the present invention and that in the comparative examples is reduced by the silicon oxide layer provided by the atmospheric pressure plasma processing.

The substrate film of the present invention has a low linear expansion coefficient, and therefore, deterioration of moisture permeability is reduced even after going through the thermal shock cycle, whereby an excellent transparent conductive film is provided. In case of the transparent conductive films 219 through 221 of comparative examples, the moisture permeability can be reduced by formation of a moisture proof layer. However, since the substrate films 119 through 121 as the substrates have a high linear expansion coefficient, the moisture proof layer is cracked and the moisture permeability deteriorates due to the expansion and shrinkage of the support member after goring through the thermal shock cycle. The transparent conductive films 222 and 223 are subjected to deformation during the thermal shock cycle because the heat resistance of the substrate films 122 and 123 is low. This is not preferred.

Atmospheric pressure plasma processing allows the transparent conductive films of high transmittance and low specific resistance to be formed on the substrate films of the present invention and those of comparative examples.

Embodiment 3

Figure 4:
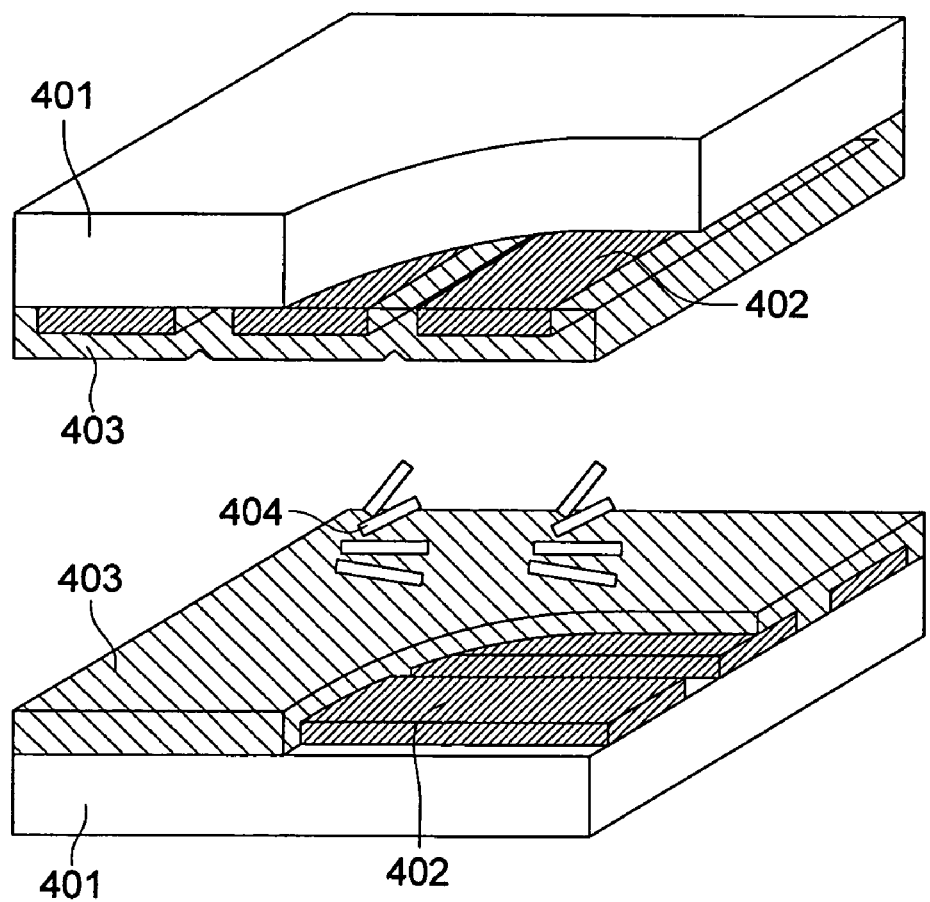
FIG. 4 is a perspective view representing a liquid crystal display device.

A TN liquid crystal display device given in FIG. 4 was manufactured according to the following procedure, using the aforementioned transparent conductive films 201 through 205 and 207 through 218 of the present invention, and the transparent conductive films 206 and 219 through 223 of comparative examples.

<How to Manufacture the TN Liquid Crystal Display Device>

A resin layer (not illustrated) for smoothing was coated on the aforementioned transparent conductive film as a transparent conductive substrate 401. A transparent conductive film was formed further on this resin layer directly or via a silicon dioxide film. This was provided with patterning to form a stripe-like shape, so that a display electrode 402 was formed. An opposing substrate was produced using the same transparent conductive substrate. Namely, a display electrode was formed on the opposing substrate side as well. Further, an oriented film 403 and sealing material (not illustrated) were formed by a printing method or the like. Two substrates were placed opposite to each other after spraying with spacer, and a hollow cell was formed by pressure contact. A liquid crystal 404 was introduced into this hollow cell by vacuum injection, and the terminal portion was taken out so that the drive voltage would not be applied to the opposing display electrodes. Then a liquid crystal display device was assembled by a combination of a phase difference plate, deflecting plate, touch panel and light source (not illustrated).

In the liquid crystal display device manufactured in the aforementioned method, excellent images were provided by the transparent conductive films 201 through 205 and 207 through 218 of the present invention. However, image distortion and color misregistration were observed in the case of the transparent conductive films 206 and 219 through 223 of the comparative examples.

Embodiment 4

Figure 5:
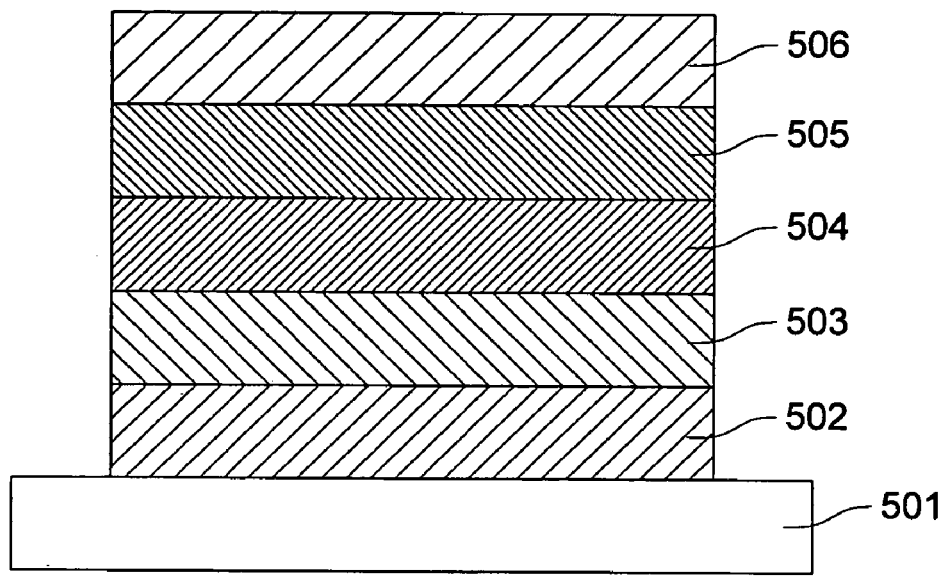
FIG. 5 is a conceptual diagram representing an example of the structure of an organic electroluminescence display device.

A simple matrix drive type organic electroluminescence display device given in FIG. 5 was manufactured according to the following procedure, using the transparent conductive films 201 through 205 and 207 through 218 of the present invention, and the transparent conductive films 206 and 219 through 223 of the comparative examples.

<How to Manufacture the Organic Electroluminescence Display Device>

A transparent conductive film 502 (anode) was pattern on the aforementioned transparent conductive film as a transparent conductive substrate 501. After that, using the neutral detergent, acetone and ethanol, the film was subjected to ultrasonic cleaning. The film was then pulled out of the boiled ethanol and was dried. After the surface of the transparent conductive film was subjected to UV/O$_3$ cleaning, N,N'-diphenyl-m-tolyl-4,4'-diamine-1,1'-biphenyl (TPD) was deposited to a thickness of 55 nm at a deposition rate of 0.2 nm per second using a vacuum deposition apparatus, whereby a positive hole injection and transport layer 503 was formed.

Further, Alq$_3$: tris(8-quinolinolate)aluminum was deposited to a thickness of 50 nm at a deposition rate of 0.2 nm per second, whereby an electron injection, transport and light emission layer 504 was formed.

Then a cathode film 505 was manufactured to a thickness of 200 nm by a sputtering apparatus according to the DC sputter method, wherein the Al—Sm alloy (Sm: 10 at %) was used as a target. In this case, argon was used as a sputter gas. The gas pressure was 3.5 Pa and the distance between the target and substrate (Ts) was 9.0 cm. The power supplied was 1.2 W/cm$^2$.

In the final phase, SiO$_2$ was sputtered to a thickness of 200 nm to form a protective layer 506, thereby producing an organic electroluminescence display device. This organic electroluminescence display device was composed of two parallel stripe-like cathodes and eight parallel stripe-like electrodes arranged orthogonal to each other, wherein 2×2 mm matrix device units (pixels) are arranged at intervals of 2 mm to form a 16-pixel device with a 8×2 matrix.

The organic electroluminescence display obtained in the aforementioned procedure was driven at 9 volts. In the transparent conductive films 201 through 205 and 207 through 218 of the embodiment, a luminance of 350 cd/m$^2$ or more was produced. However, in the case of the transparent conductive films 206 and 219 through 223 of the comparative examples, the luminance was only 50 cd/m$^2$ or less. The required intensity of light emission in an organic electroluminescence display device could not be achieved.

Embodiment 5

Figure 6:
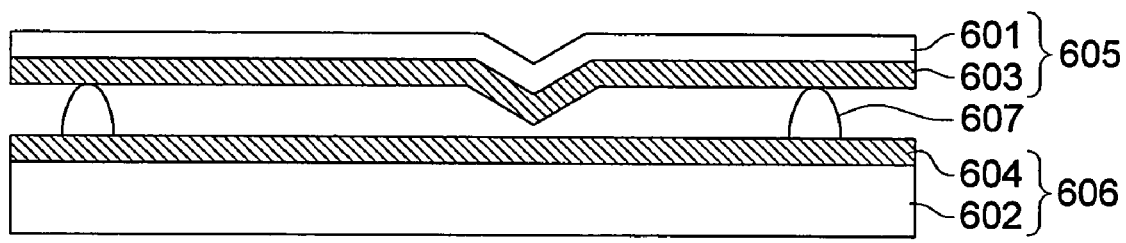
FIG. 6 is a cross sectional view showing an example of a touch panel.

A touch panel given in FIG. 6 was manufactured according to the following procedure, using the aforementioned transparent conductive films 201 through 205 and 207 through 218 of the present invention, and the transparent conductive films 206 and 219 through 223 of comparative examples.

<How to Assemble the Touch Panel>

The touch panel glass ITO 602 (sputtering film) was used as the lower electrode 606 shown in FIG. 6. The transparent conductive films 201 through 205 and 207 through 218 of the present invention, and the transparent conductive films 206 and 219 through 223 of comparative examples were used as the transparent conductive substrate 601 of the upper electrode 605. Transparent conductive film surfaces 603 and 604 were arranged face to face with each other. Using the thermosetting type dot spacer 607, a panel was produced at intervals of 7 μm, whereby a touch panel was assembled.

An image was placed below the touch panel assembled in the aforementioned procedure. It was observed from an angle of 45 degrees, and a visibility test was conducted to check if the image viewed through was free from any distortion or not. This test revealed that the image was observed without any distortion in the case of the transparent conductive films 201 through 205 and 207 through 218 of the present invention. However, the image was distorted in the case of the transparent conductive films 206 and 219 through 223 of comparative examples.

INDUSTRIAL APPLICABILITY

The present invention provides a transparent film for display substrate such as a liquid crystal display, organic electroluminescence display or touch panel characterized by low birefringence, positive waveform dispersion properties, high glass-transition temperature and a low linear expansion coefficient.

If a moisture proof film is provided on the transparent film for display substrate of the present invention, the moisture permeability of the film can be reduced without adversely affecting the electronic devices using the substrate film.

A transparent conductive film of high transparency and low specific resistance can be coated on the transparent film for display substrate of the present invention provided with the moisture proof film.

If a moisture proof film and transparent conductive film provided on the transparent film for display substrate of the present invention are formed by atmospheric pressure plasma processing, manufacture of high-quality transparent conductive films with improved productivity is ensured.

Thus, the present invention allows production of a high-quality liquid crystal display, organic electroluminescence display and touch panel.

The invention claimed is:

1. A display substrate comprising:
a moisture proof film containing a metal oxide or metal nitride formed on at least one of the surfaces of a transparent film and a transparent conductive film formed on the moisture proof film or on the surface opposite to the surface where the moisture proof film is formed, the transparent film containing:
a cellulose ester,
a crosslinked vinyl polymer obtained by polymerization of a low molecular compound, the low molecular compound having a molecular weight of 1,000 or less and having a polymerizable unsaturated double bond, and
a plasticizer in an amount of less than 1 percent,
wherein the transparent film is drawn 3 through 100 percent both in a conveyance direction and a lateral direction.

2. The display substrate of claim 1, wherein said moisture proof film is mainly composed of silicon oxide.

3. The display substrate of claim 1, wherein the moisture proof film and the transparent conductive film are by applying a high frequency voltage between opposed electrodes under atmospheric pressure or under approximately atmospheric pressure for a discharge, generating a reactive gas in the plasma state by the discharge, exposing the transparent film to the reactive gas in the plasma state whereby the moisture proof film and the transparent conductive film are formed on the transparent film.

4. A liquid crystal display using the display substrate in claim 1.

5. An organic electroluminescence display using the display substrate in of claim 1.

6. A touch panel using the display substrate in claim 1.

7. The display substrate of claim 1, wherein the transparent film contains a hydrolyzed polycondensate of the cellulose ester and an alkoxysilane expressed by the following general formula (1):

$$R_{4-n}Si(OR')_n \qquad \text{General formula (1)}$$

wherein R and R' represent a hydrogen atom or monovalent substituents independently, and n denotes 3 or 4.

8. The display substrate of claim 7 wherein the hydrolyzed polycondensate of the cellulose ester and the alkoxysilane expressed by the general formula (1) are expressed by the following general formula (2), and a total amount of an inorganic high molecular compound expressed by the general formula (2) is less than 40 percent by mass in the transparent film:

$$R_{4-n}SiO_{n/2} \qquad \text{General formula (2)}$$

wherein R represents a hydrogen atom or monovalent substituents.

9. The display substrate of claim 1, wherein the transparent film contains an organic crosslinking agent having a plurality of any of an isocyanate group, a thioisocyanate group an acid hydride residue, in an amount of 1 through 20 percent by mass so that the cellulose ester is crosslinked.

10. The display substrate of claim 1, wherein the number average molecular mass of the cellulose ester is 100,000 or more.

11. The display substrate of claim 1, wherein the substituent of the cellulose ester satisfies the following formula (A) and (B):

$$0 \leq Y \leq 1.5 \qquad \text{Formula (A)}$$

$$1.0 \leq X+Y \leq 2.9 \qquad \text{Formula (B)}$$

wherein X denotes the degree of substitution by an acetyl group and Y indicates the degree of substitution by using a substituent containing an alkoxysilyl group.

12. The display substrate of claim 1, wherein the degree of substitution of said cellulose ester by the acetyl group is 2.2 through less than 2.9.

13. The display substrate of claim 1, wherein the transparent film contains the crosslinked polymer in an amount of 5 through 50 percent by mass of the transparent film.

14. The display substrate of claim 1, wherein the transparent film is composed of a cellulose film of which glass-transition temperature obtained by thermal mechanical analysis (TMA) is 180 degrees Celsius or more, and the coefficients of linear expansion in both MD and TD directions are in the range from 5 through 50 ppm/degrees Celsius.

15. The display substrate of claim 1 wherein, when the in-plane retardation value at the wavelength of 590 nm is $R_0$ (590) and the in-plane retardation value at the wavelength of 480 nm is $R_0$ (480), the ratio $[R_0(480)/R_0(590)]$ in the transparent film is not less than 0.8 through less than 1.0.

16. The display substrate of claim 1, wherein the low molecular compound has in the molecule a vinyl group, an allyl group, an acryl acid residue or an methacryl acid residue.

17. A display substrate comprising:
a moisture proof film containing a metal oxide or metal nitride formed on at least one of the surfaces of a transparent film and a transparent conductive film formed on the moisture proof film or on the surface opposite to the surface where the moisture proof film is formed, the transparent film for display substrate containing:
a cellulose ester,
a cellulose ester crosslinked by a compound containing a plurality of reactive groups, the reactive group being an epoxy group or an acid hydride group, and
a plasticizer in an amount of less than 1 percent,
wherein the transparent film is drawn 3 through 100 percent both in a conveyance direction and a lateral direction.

18. The display substrate of claim 17, wherein the reactive group is an epoxy group.

19. The display substrate of claim 17, wherein the reactive group is an acid hydride group.

* * * * *